United States Patent [19]

Steutermann

[11] Patent Number: 5,198,973
[45] Date of Patent: Mar. 30, 1993

[54] SELECT-A-RANGE CONTROL DEVICE

[76] Inventor: Edward M. Steutermann, 13305 Laurel Ct., Prospect, Ky. 40059

[21] Appl. No.: 511,052

[22] Filed: Apr. 19, 1990

Related U.S. Application Data

[63] Continuation-in-part of Ser. No. 407,962, Sep. 14, 1989.

[51] Int. Cl.$^5$ .............................................. G06F 15/00
[52] U.S. Cl. ......................... 364/167.01; 251/129.01; 251/129.05; 364/183; 318/601
[58] Field of Search ............. 364/167.01, 183, 474.01; 318/599, 600–603; 251/129–141

[56] References Cited

U.S. PATENT DOCUMENTS

| | | | |
|---|---|---|---|
| 3,155,955 | 11/1964 | Davidson | 340/870.27 |
| 3,584,203 | 6/1971 | Patzelt | 364/183 |
| 3,622,766 | 11/1971 | David | 364/183 |
| 3,752,969 | 8/1973 | Kiffmeyer | 364/183 |
| 3,942,718 | 3/1976 | Palmieri | 364/183 |
| 3,976,963 | 8/1976 | Kubler | 335/206 |
| 4,068,163 | 1/1978 | Foxworthy | 324/207 |
| 4,312,033 | 1/1982 | Sweeny | 364/167 |
| 4,356,554 | 10/1982 | Susnjara | 364/183 |
| 4,417,312 | 11/1983 | Cronin | 364/183 |

Primary Examiner—Allen R. MacDonald

[57] ABSTRACT

A control device utilizing multidigit binary coded position signals generated in a selected sequential format by a position transmitter to indicate the position of an element movable between limits in increments of the travel path of the element. The position signals are supplied to a comparator device. A process signal reflective of a range of a process condition is supplied as a binary coded digital process signal to a reference device which generates digital binary coded command position signals in selected sequential format compatible with the binary coded position signals so each binary coded command signal indicates a desired position of the movable element. The binary coded command position signals are supplied to the comparator device. The comparator device compares the binary coded position signal and the current current binary coded command position signal and in the event of a mismatch operates an actuator device to move the movable element to the current binary coded command position selected by the reference device. The process signal can be divided into several different control ranges and in each range a series of command position signals can be generated in response to the process signals.

25 Claims, 10 Drawing Sheets

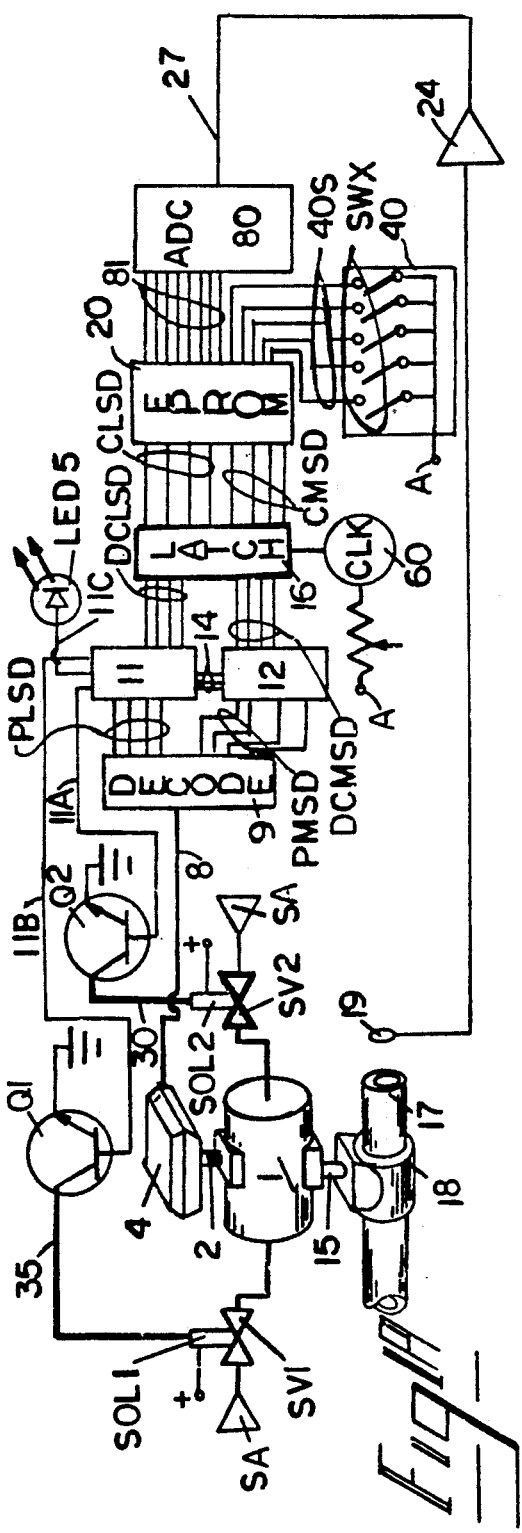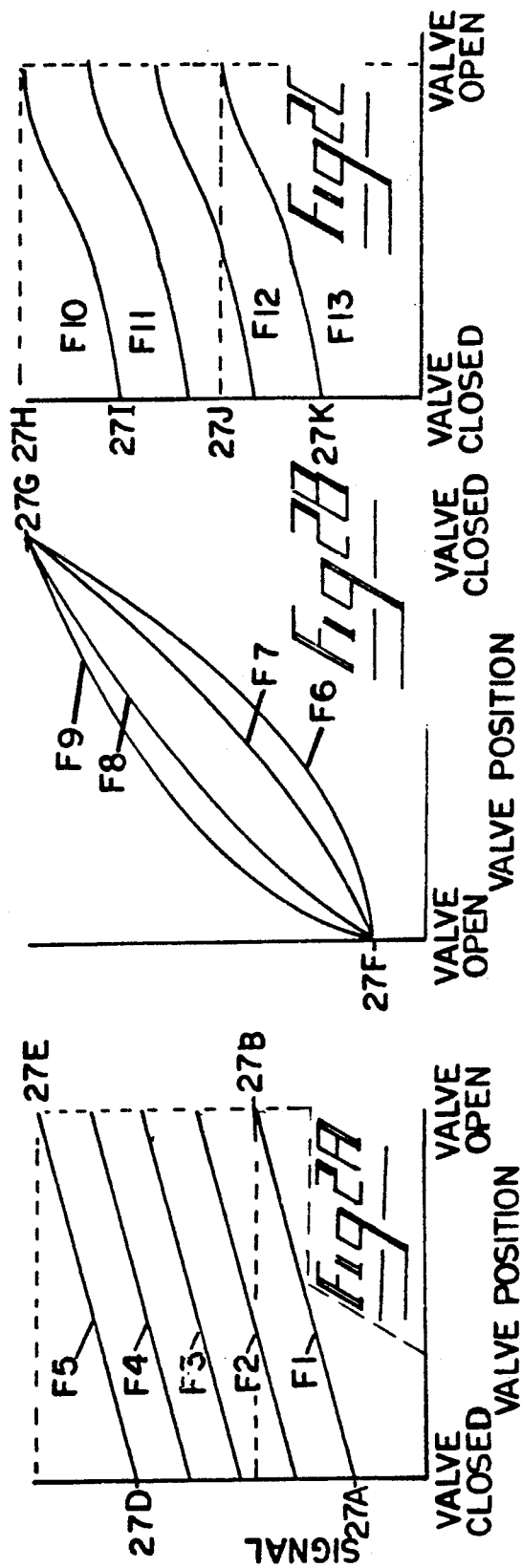

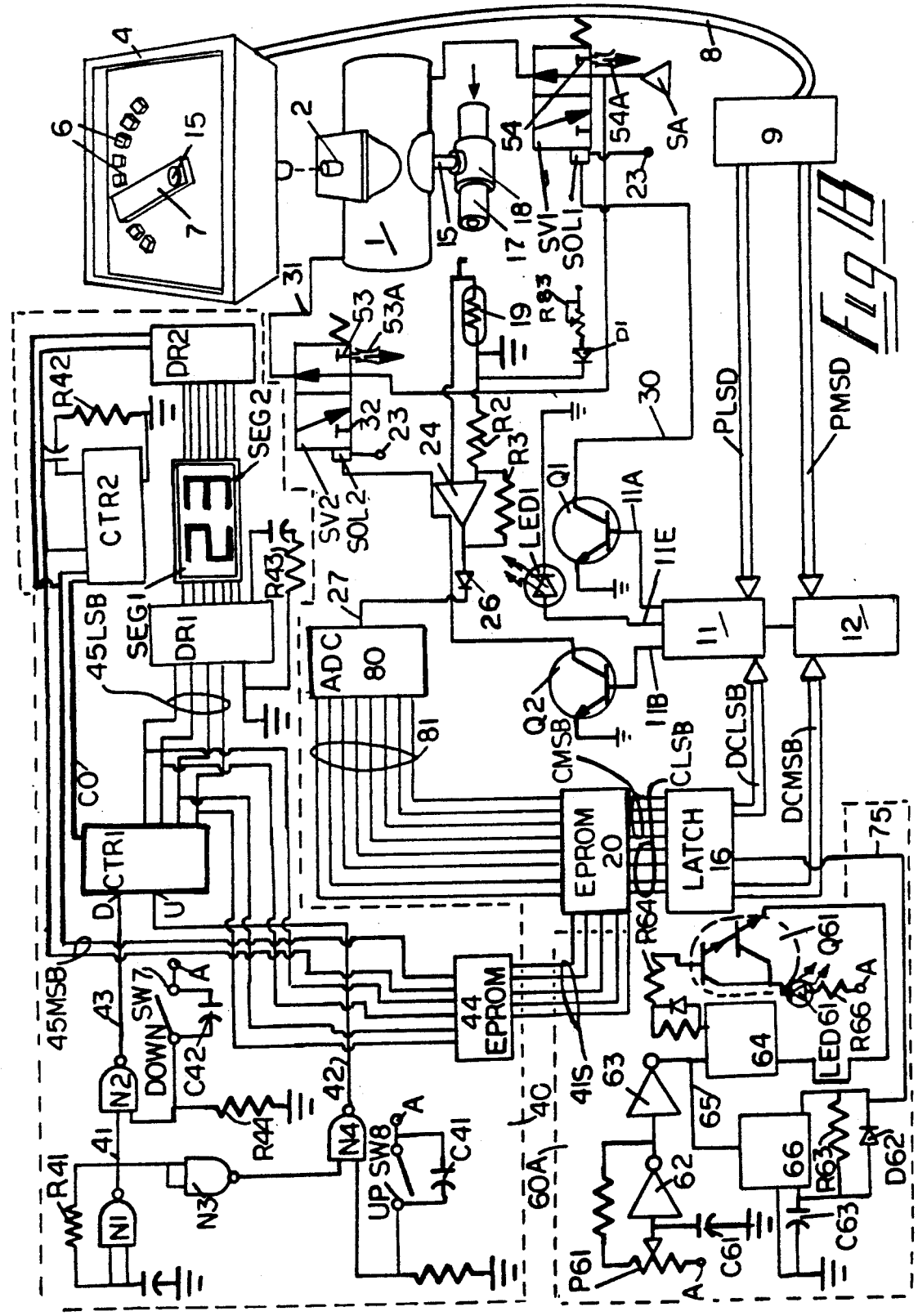

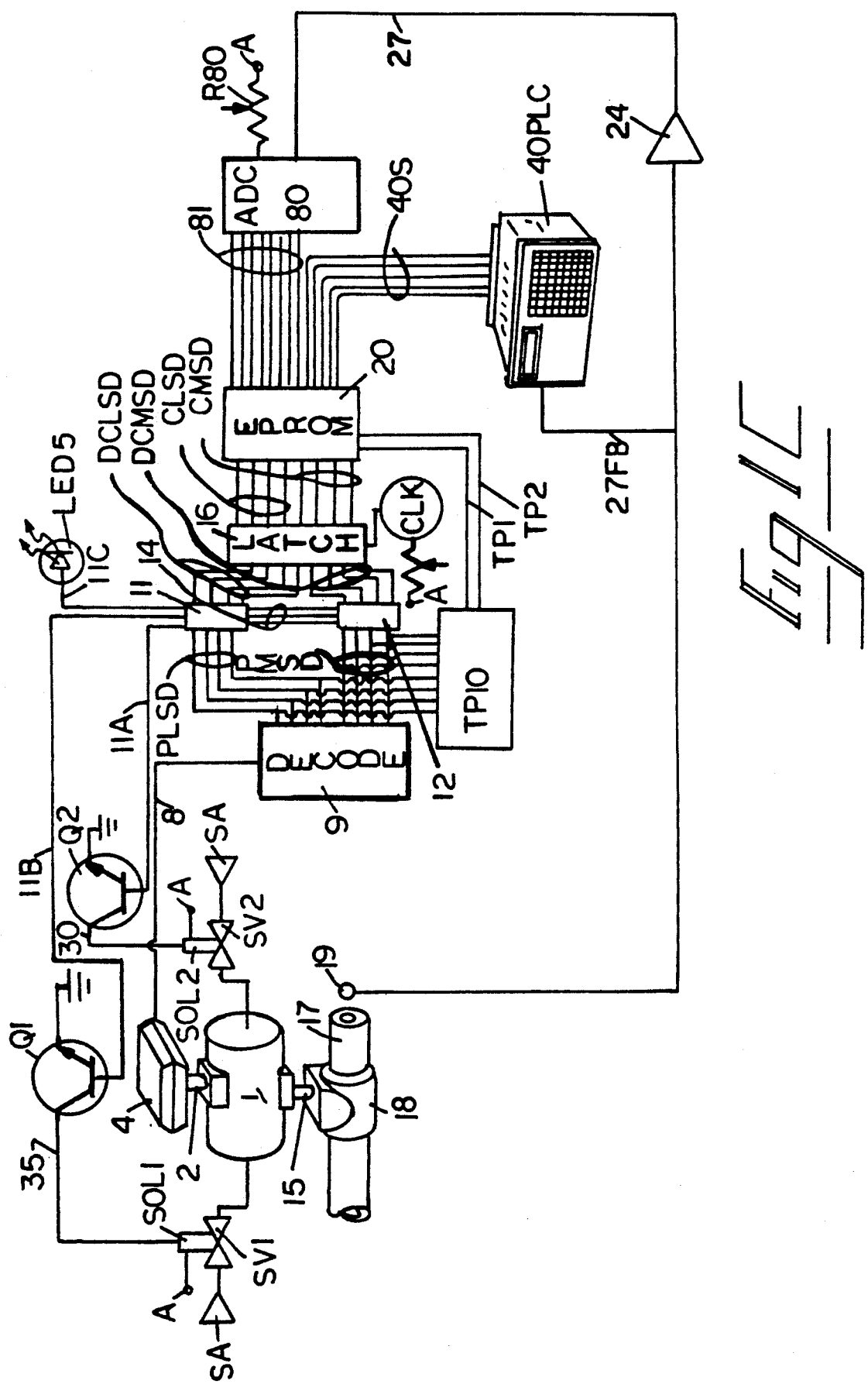

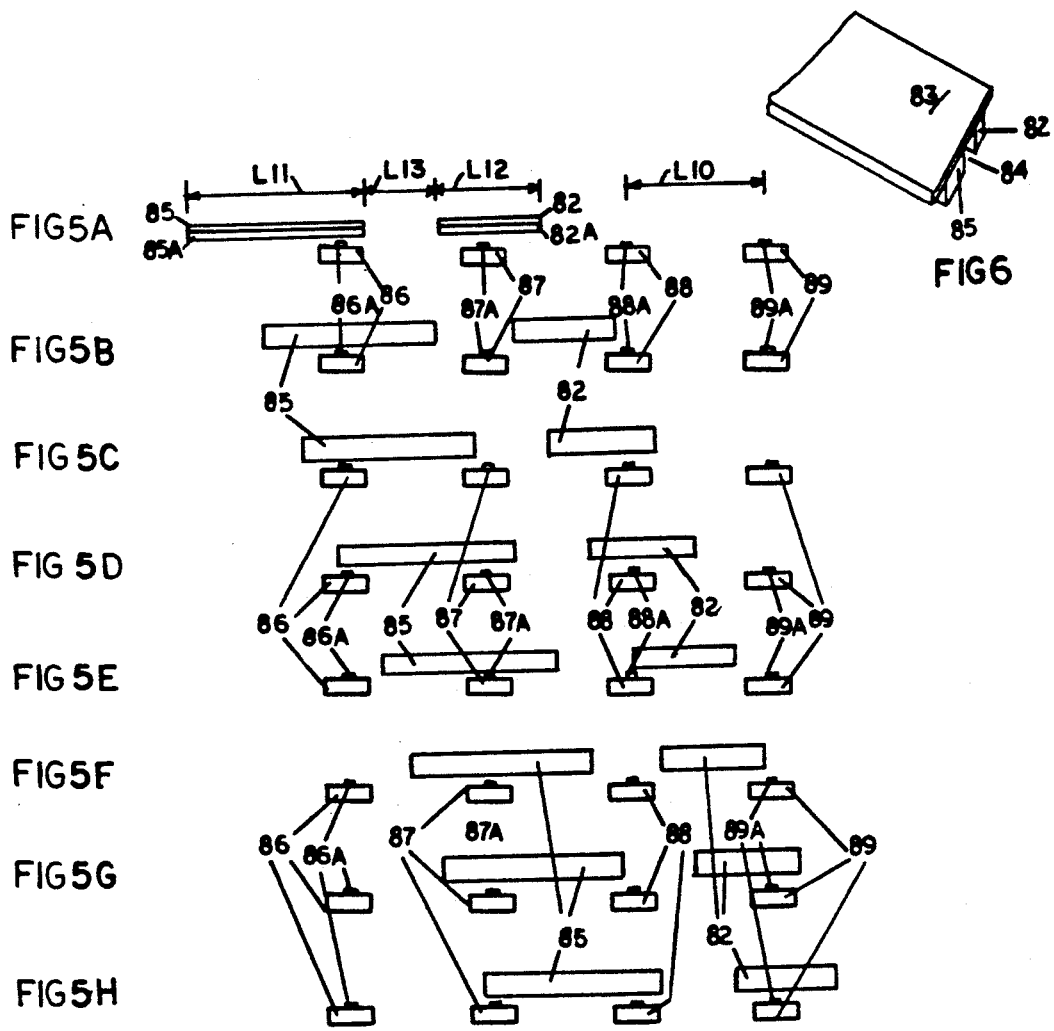

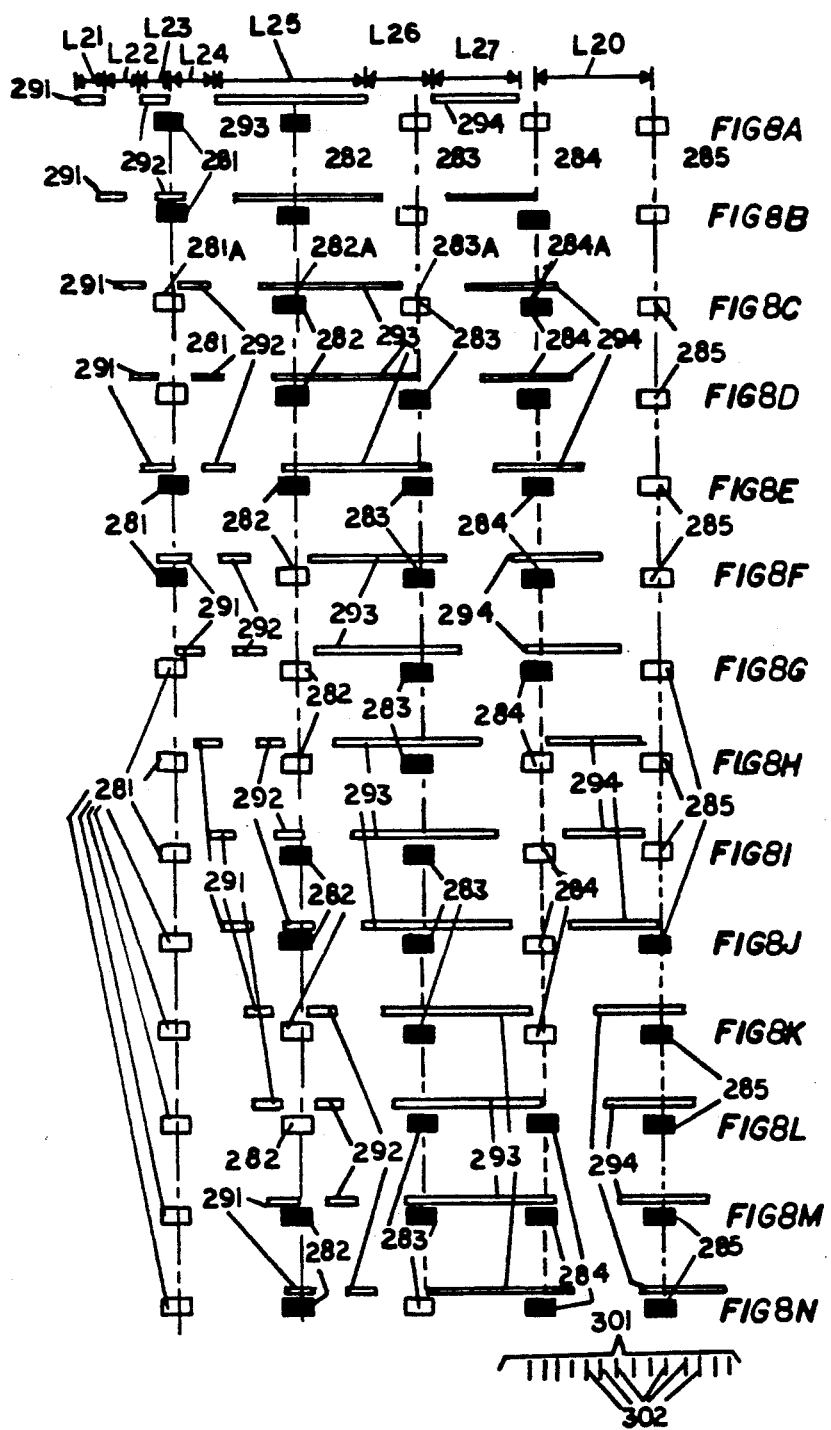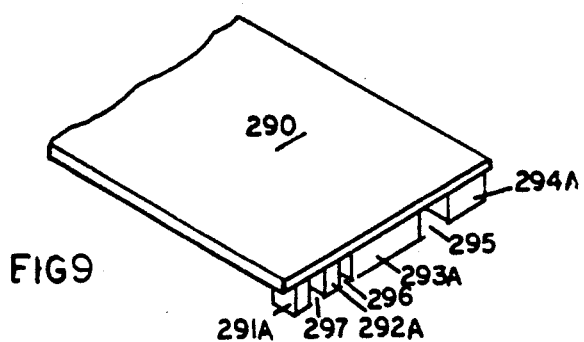

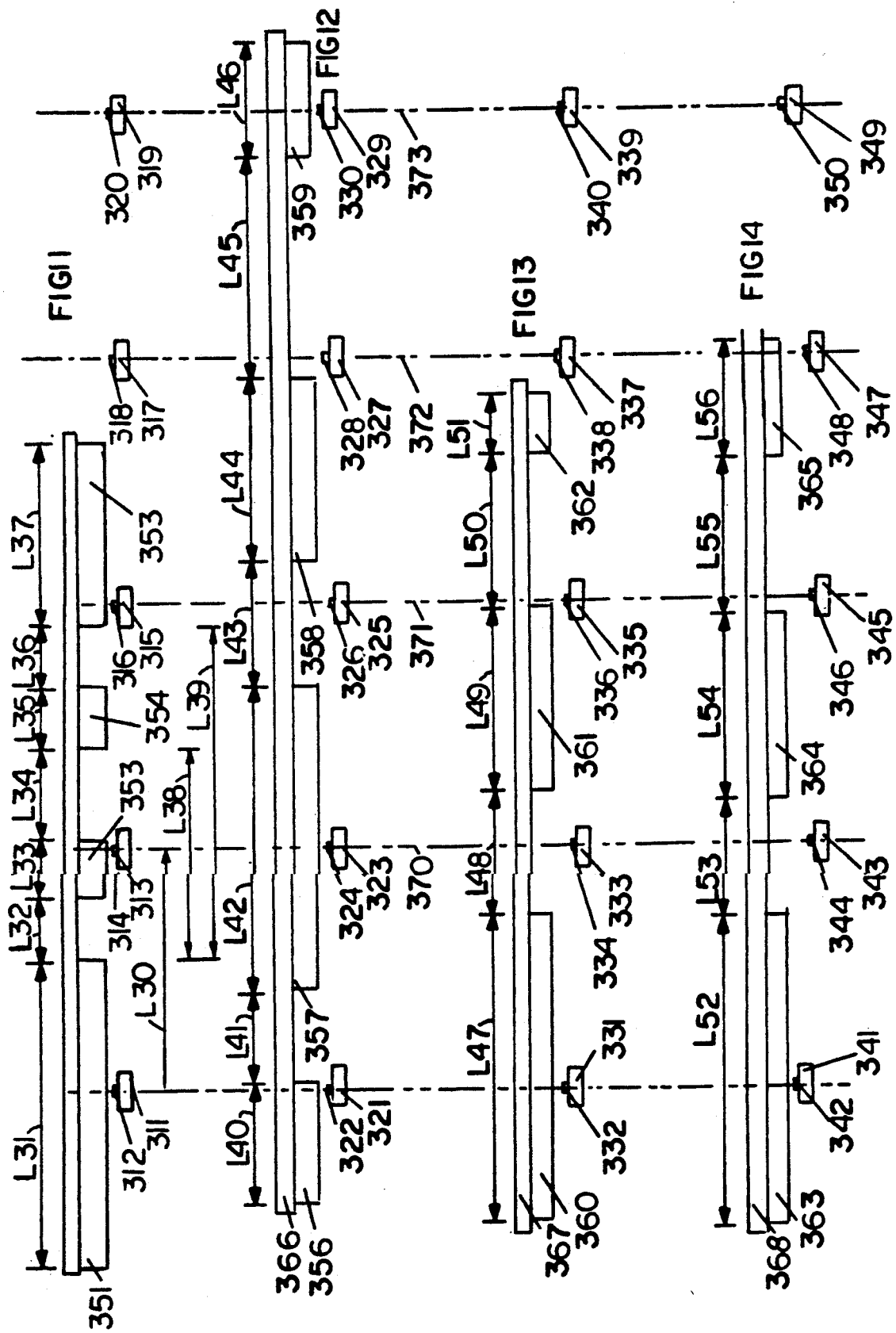

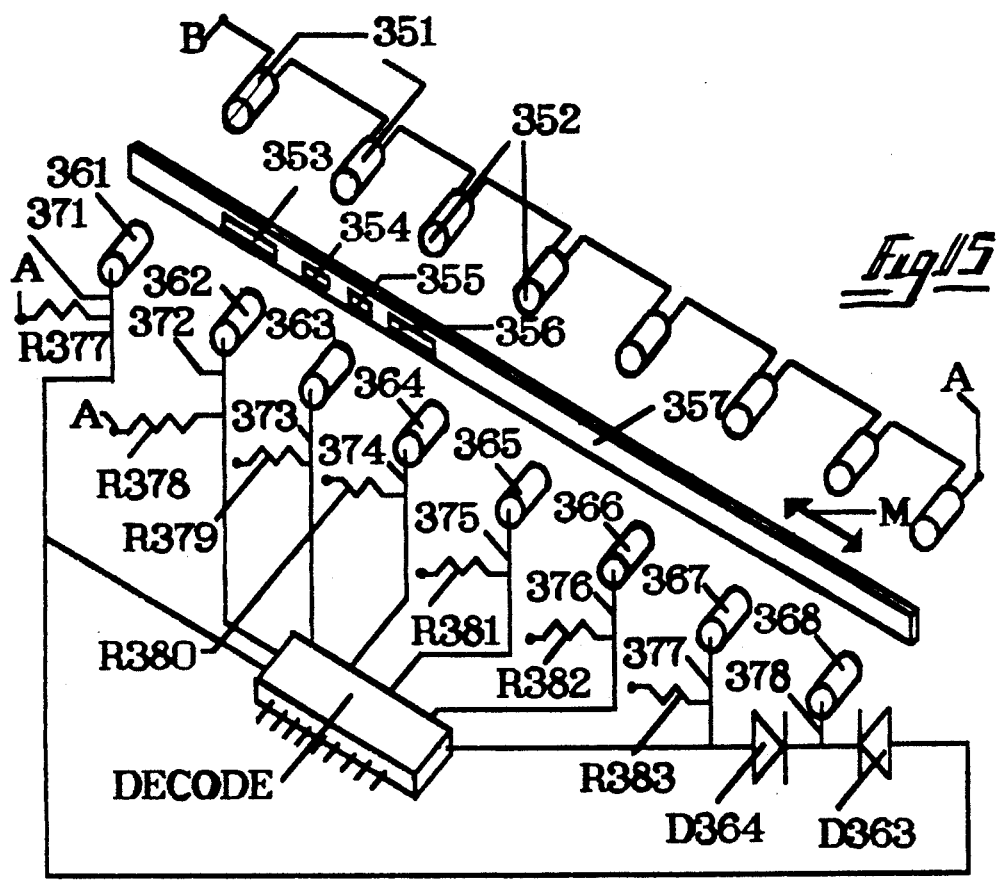
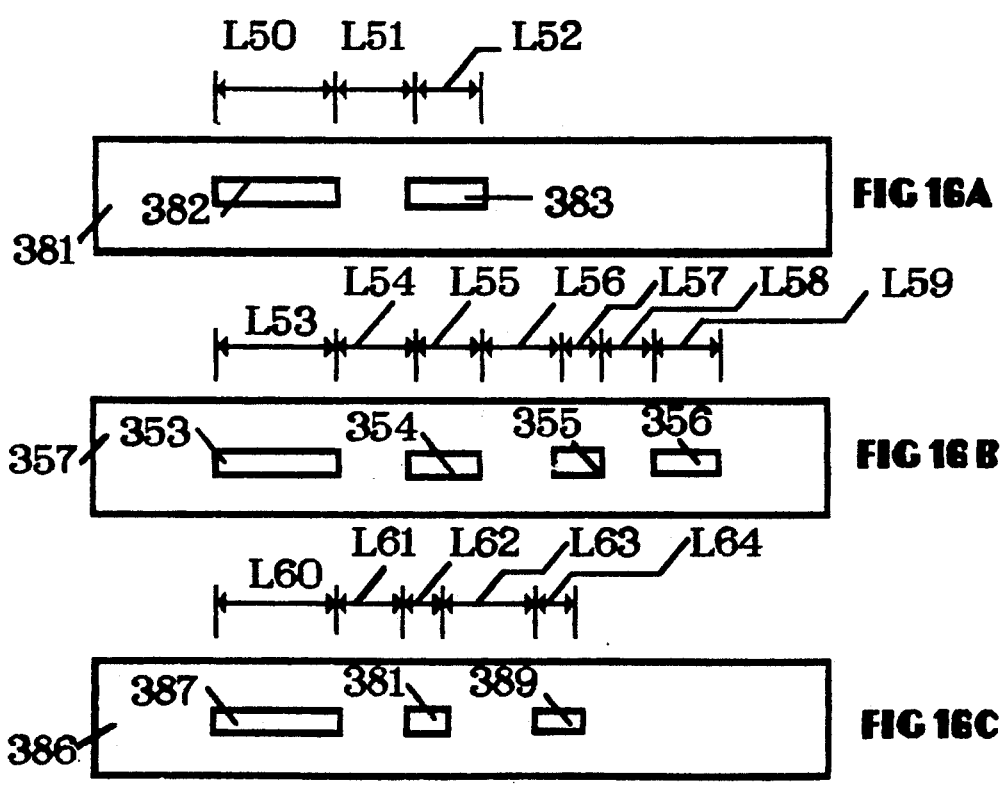

SELECT-A-RANGE CONTROL DEVICE

BACKGROUND OF THE INVENTION

This application is a continuation-in-part of my copending application Ser. No. 407,962 filed Sep. 14, 1989, now abandoned.

The present invention relates to control devices useful for process control and more particularly relates to devices for operating an actuator to position a final control element such as a valve, damper, or other movable element to adjust a process condition, for example to control flow of fluid to maintain a selected pressure, temperature, flow rate or level. Applications within the scope of the present invention include control of longitudinal movement, of a control element in positioning linearly moving valve stems, as well as actuator devices for positioning rotary devices.

Typical prior art control systems include a transducer device to generate a process signal in response to the process condition to be controlled. The process signal is supplied to a controller adapted to provide an output process command signal indicative of the position of a control element required to maintain the process condition at the selected level. In typical applications prior art the process command signal is an electrical signal which is supplied to a signal transducer which generates a pressure signal to operate a pneumatic positioning device which operates an actuator to position the final control element. Entirely electrical system systems are also known in the prior art where the electrical signal controls an electrical actuator.

Another device for controlling and positioning final control elements is described in my U.S. Pat. No. issued Apr. 3, 1990.

Heretofore the control and positioning functions have generally been accomplished by separate elements. No prior art arrangement is known which uses a digital format system to accept a digital or analog signal from a process transducer and position a final control element in response to change in the process condition.

Prior art control arrangements have generally included on/off, proportional, proportional plus integral and proportional plus derivative as well as proportional plus intergral plus deravitive controllers.

On/Off control devices and are satisfactory in many applications but in most cases a simple on/off controller is inadequate to provide desired control since no modulation is provided. More sophisticated controllers may provide more control response than necessary and in some instances provide excessive control but in any case are more complex and expensive than required for many applications.

The present invention recognizes that there are certain process control functions where satisfactory control can be achieved by modified integral and proportional control or floating set point proportional control.

Another prior art arrangement is described in U.S. Pat. No. 4,417,312 which teaches a controller arrangement responsive to two signals. One of the signals is from a process sensor and represents the magnitude of the process parameter while a second signal representative of the desired magnitude of the process parameter is also supplied. The difference in the signals is used to control the direction of movement of the signals and the magnitude of the difference is used to control the rate of movement. Contrary to devices within the scope of the present invention, the signals in the prior art arrangement are all analog and the reference does not teach, or even remotely suggest, generation of a binary position command signal corresponding to a selected desired position, generating position signal indicative of the actual position of the control element in binary format, comparing the two and then moving an actuator until the final control element position corresponds to the selected position.

In general no prior art device is known which moves the final element, for example a valve stem, to positions determined by a program reference device where a number of control ranges and response modes are provided and where the particular position to be which the actuator is to move is determined by the value of the process parameter.

SUMMARY OF THE INVENTION

The present invention provides integrated digital mode process control and positioning for final control elements such as valves or dampers. Virtually all prior art arrangments, which utilize electrical controllers, generate analog control signals which are converted to pneumatic signals to operate pneumatic positioners such prior art systems are expensive, have inherent instability, and do not provide integral control and positioning of the final control element.

Devices within the scope of the present invention provide effective yet inexpensive process control and require little maintenance. Further, rapid response and smooth operating characteristics are achieved and overshoot of the controlled process variable is diminished.

In general systems within the scope of the present invention use a process condition signal from a process transducer, which can be analog or digital. Where the signal is analog it is converted to digital format. The process signal is supplied to a reference device which has programmed control ranges each of which represents a portionj of the open of the process signal. Binary coded position command signals are generated in each control range and used to position the final control element to maintain the level of the process signal within the selected control range.

Devices within the scope of the present invention provide fully closed loop positioning and control and response speed can be adjusted. Moreover, devices within the scope of the present invention are useful in both electronic and fluid operated positioning devices such as pneumatic or hydraulic operated actuators to operate valves and/or other final control devices.

More particularly, the present invention provides a control device utilizing multidigit binary coded position signals generated in a selected sequential format by a position transmitter to indicate the position of an element movable between limits in increments of the travel path of the element. The position signals are supplied to a comparator device. A process signal reflective of a range of a process condition is supplied as a binary coded digital process signal to a reference device which generates digital binary coded command position signals in selected sequential format compatible with the binary coded position signals so each binary coded command signal indicates a desired position of the movable element. The binary coded command position signals are supplied to the comparator device. The comparator device compares the binary coded position signal and the current current binary coded command position signal and in the event of a mismatch operates an actuator device to move the movable element to the binary coded command position selected by the reference device. The process signals can be divided into several different control ranges and in each range a series of command position signals can be generated in response to the process signals. In each control range the element is operated to command positions in response to the process signal to operate a control element to maintain the process signal within the control range. Within each control range least two command position response formats can be provided and the reference element receives an indication of the position signal and switches the command signal between the response formats in response to the current position signal, a timer device can be provided to transmit position command signals from the reference device to the comparator device at selected intervals.

Examples within the scope of the present invention are illustrated in the accompanying drawings and discussed hereinafter but it will be understood that the descriptions and illustrations given herein are by way of example only and that other arrangements and applications within the scope of the present invention will occur to skilled in the art upon reading the disclosure set forth hereinafter.

BRIEF DESCRIPTION OF THE DRAWINGS

With reference to the accompanying Figures which illustrate examples within the scope of the present invention:

FIG. 1A is a general schematic illustration of an arrangement in accordance with the present invention;

FIG. 1B is a more detailed schematic of an example of an arrangement within the scope of the present invention;

FIG. 1C is a schematic of another example of an arrangement within the scope of the present invention;

FIGS. 2A-2E are schematic illustrations of operation of examples of devices within the scope of the present invention;

FIGS. 5A-5H illustrate yet another sensor/actuator relationship within the scope of the present invention;

FIG. 6 illustrates a magnetic actuation arrangement useful in arrangements of the type shown in FIGS. 5A-5H;

FIG. 7 shows a truth table for the position shown in FIGS. 5A-5H;

FIGS. 8A-8N illustrate another sensor/actuator relationship within the scope of the present invention;

FIG. 9 illustrates a magnetic actuation arrangement useful in arrangements of the type shown in FIGS. 8A-8N FIG. 10 shows a truth table for the positions shown in FIGS. 8A-8N;

FIG. 11 illustrates another sensor/actuator relationship within the scope of the present invention;

FIG. 12 illustrates another sensor/actuator relationship within the scope of the present invention;

FIG. 13 illustrates another sensor/actuator relationship within the scope of the present invention;

FIG. 14 illustrates another sensor/actuator relationship within the scope of the present invention;

FIG. 15 illustrates another example of a position transmitter device useful in devices in accordance with the present invention;

FIGS. 16A-16C illustrate slotted shutter devices useful in position transmitters of the type shown in FIG. 17;

FIGS. 17A-17J illustrate sequential positioning of the slotted shutter of FIGS. 17A-17C; and, FIG. 18 is a truth table illustrating sensor condition for the sequence of positions shown in FIGS. 17A-17J;

DETAILED DESCRIPTION OF THE DRAWINGS

Figure 2E:
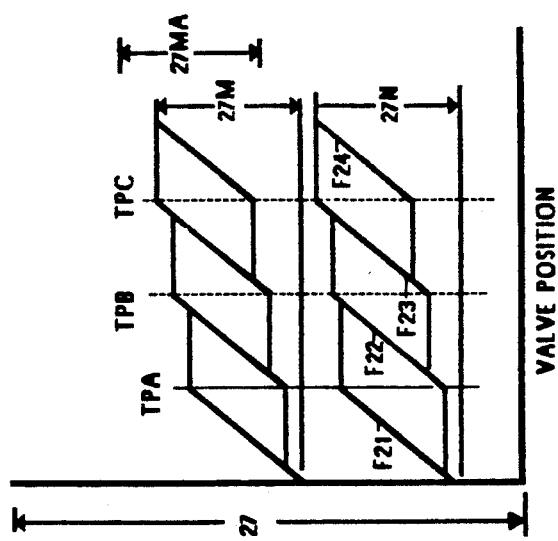

In the example shown in FIGS. 1A, 1B where common reference designations are used to indicate the same element in both views, a position transmitter 4 of the type described hereinafter is provided with a shaft connected to a shaft 2 of an actuator 1 which also has an output shaft 15 connected to a valve 18 which regulates flow of fluid to affect the valve of a process condition measured by transducer 19. Transducer 19 provides a process signal, 27 which can as in the illustrated case be an analog signal. Also, in the various views reference or source voltage is shown as "A" and it will be understood that appropriate voltage is provided for the particular application in question.

While various types of devices can be used to move the final element in FIGS. 1A and 1B. Actuator 1 is a fluid powered actuator operated by two solenoid valves SV1 and SV2. In this case actuator 1 is double acting so solenoids valves SV1 and SV2 can be 3-way normally open valves. Pressurized fluid is supplied from supply SA to the inlet port of each of the solenoid valves. When normally open solenoid valves are used as shown pressure is continuously applied to opposite sides of the element (not shown) of the actuator 1. When the solenoid valves are off (power is not supplied to the solenoid coils SOL1 and SOL2), solenoid valves SV1-SV2 are operated to exhaust fluid. Solenoid SOL 1 or SOL2 respectively associated with the valves SV1 and SV2 is actuated by Power supply 23, which can supply direct electrical, current to each of the solenoids. Leads 35, 30 are provided from the solenoids SOL1 and SOL2 to transistors Q1 and Q2 connected as shown. Transistors Q1 and Q2 are operated by the outputs 11A, 11B from a comparator 11 to the bases of the transistors Q1 and Q2 which, in the example shown, go conductive to ground. In the arrangement shown when one of the transistors is gated by a control signal from the comparator 11 the transistor allows current flow to actuate the associated solenoids SOL1, SOL2 to operate the associated solenoid valve to the exhaust position to move the actuator. Thus, for example, if the solenoid SOL2 associated with the solenoid valve SV2 is actuated by solenoid $Q_2$ in response to a signal at output 11A then the solenoid valve SV1 exhausts air. Because air is still supplied through solenoid valve SV2 the actuator moves to reposition the valve element. A restrictor 53A could be provided in the exhaust port to restrict the rate of loss of fluid from the actuator conduit 31 to regulate the speed of movement of the actuator element and the speed of movement of the valve member (not shown) in the valve 18. The restriction is done to allow the movement to be restricted to a speed which allows operation of the solenoid SV1 (or in the other case SV2) and equilibrium pressure to be established on either side of the element (not shown) of the actuator 1 while the actuator is in the segment of the travel path called for by the command signal.

A similar arrangement is provided for solenoid valve SV1 from transistor Q1 to move the actuator in the opposite direction.

As also shown the valve 18 is in a conduit 17 which conducts a flow of fluid to be controlled. The fluid is passed over a sensor 19, for example a resistance temperature detector (RTD) shown in Digure 113, or other sensor, to determine the state of the process condition to be controlled. In the example shown in FIG. 1B resistance temperature detector RTD 19 receives power from a reference source 83 through an adjusting resistor R1 and temperature compensating diode D1. The output from RTD 19 is connected through a reference resistor R2 to signal amplifier 24 to condition the signal. The gain of amplifier 24 is set by the value of resistor R3, or other means known in the art. To further stablize the signal a voltage follower buffer 26 can be provided in the output of amplifier 24 to provide a modified process signal 27 from the output of 26 of the voltage follower buffer.

As previously described shaft 2 is connected to a position transmitter 4, described hereinafter, which generates a multidigit binary coded signal indicative of the position of the shafts 2 and 15 in increments of position in the span of the actuator. In the example shown the actuator 1 is a quarter turn actuator adapted to drive a valve 18 to regulate flow through pipe 17. The multidigit binary position signals generated by transmitter 4 are supplied by a data cable 8 to a digital decode device 9, for example an on eraseable programmable read only memory integrated circuit. Decode device 9 is programmed to convert the input data to actuator position signals icluding position least significant digit (PLSD) and position most significant digit (PMSD) data which is supplied to comparators 11 and 12 as shown. The position position signals are usually generated sequentially in binary coded decimal format by movement of the actuator. In any case the data is generated in the same format as the command position data as described in more detail hereinafter.

Referring again to FIG. 1B RTD sensor 19 provides output signal 27 which can be either analog or digital but where as shown in FIG. 1B the signal is analog it is supplied to an analog to digital convertor (ADC) 80. converter 80 converts the analog signal to process multidigit binary output signal 81. The process multidigit binary output signals 81 are supplied to a decode device such as an Erasable Programmable Read Only Memory (EPROM) 20 where the binary coded process signals actuate specific stored responses at the outputs CMSD and CLSD to generate, in this case, command position binary coded decimal signals including a least significant digit CLSD and a most significant digit CMSD.

The command position binary signals indicate a position the actuator is moved to in response to the input binary process signal. Within the scope of the present invention a program select device 40, such as an up down counter as described in FIG. 1B, or a simple set of switches, SWX as shown in FIG. 1A can be provided to supply index input signals to the decode device, EPROM 20 to select different ranges of output signal CLSD and CMSD depending on the range in which it is desired, to control the condition sensed by RTD sensor 19 as described hereinafter.

In the arrangements shown the CLSD and CMSD signals indicate a desired position for the valve in response to the current value of the input signal 27 from RTD sensor 19. The overall range of the process signal in which the command position signals are generated is determined by the program select 40. The actual output signals CLSD and CMSD are determined by the value of pro signal 27 which has been converted to digitized signal 81. In accordance with a feature of the present invention the signals generated by program select 40 characterize the outputs CMSB AND CLSB to provide command signals, examples of which are illustrated in FIGS. 2A-2C as described hereinafter, as well as other characterized responses suitable for particular applications. The output command multidigit binary output command signals CLSD and CMSD are supplied directly or indirectly to comparators 11 and 12. In the arrangement shown the signals CLSD and CMSD are supplied to a latch 16, as described hereinafter which is operated by a clock 60. An example of a clock is shown in FIG. 1B.

Upon receiving a signal from the clock 60 the latch 16 then transmits the CMSB and CLSB position command signals currently appearing on the latch inputs as delayed position command signals DCLSB and DCMSB to comparators 11 and 12. Comparator 11 receives the least significant bit signals DCLSB while comparator 12 receives the most significant byte signals DCMSD. As is known in the art a carryover 14 is provided between comparators 11 and 12 to enable cooperative action between the two. Comparator 11 is provided with outputs 11A, 11B, and 11E. Output 11E is connected to an indicator, for example light emitting diode LED 1 which is actuated when there is a balance at the two sets of inputs to the comparators 11 and 12. Output 11A is actuated when the position signals from the position transmitter 4 PLSD and PMSD are out of balance in one direction with respect to the DCLSD and DCMSD position command signals while output 11B is actuated when the signals are out of balance in the other direction.

As previously discussed position signals indicative of the actual position of the valve or actuator are supplied to the other inputs to the comparators 11 and 12. The position signals are generated B7 a second decode device, EPROM 9, which provides binary position signals PMSD and PLSD indicative of the position of valve 18 in multi B15 binary format. The signals provided are the position least significant digit PLSD and the position most significant digit PMSD decoded multi digit binary signals received from digital position transmitter 4. The multidigit binary digital signal from the position transmitter 4 can be any recognized or unrecognized format determined by the configuration of transmitter and is decoded in the EPROM 9 to a sequential position data signal in the same format and range as the delayed position command signals DCLSB and DCMSB. The PLSD and PMSD signals indicate the current position of the actuator shaft and valve and are compared with the DCLSD and DCMSD command signals by comparators 11 and 12.

In response in a change in condition of the signal generated by the RTD transducer 19, corrective action is taken by movement of the valve to the position commanded by the DCLSP signals. Corrective action occurs by the actuation of the outputs 11A and 11B which are connected to the bases of power transistors Q1 and Q2 which actuate the solenoid valves SV1 and SV2.

As shown in FIG. 1B transmitter 4 includes sensors 6 are provided in a travel path and passed over by a rotor 7 which includes magnets (not shown) to actuates the sensors to generate a multidigit binary data set for each increment of the travel path as described in more detail hereinafter.

The program select can be accomplished by switches as shown in FIG. 1A or by a counter circuit 40 as shown in FIG. 1B. In FIG. 1B four NAND gates N1-N4 are connected as shown to provided a negative going pulse on output 43 of NAND gate N2 when switch SW7 is closed to positive reference A; and on output 42 from NAND gate N4 where switch SW8 is closed to reference A. Pulse 43 is supplied to the down count input D of a counter CTR1 (for example part no. 74C192) and pulse 42 is supplied to the up count input U. Thus when switch SW8 is closed the binary count on output 45LSB increments a number and when switch SW7 is closed the count on output 45LSB is decreased by one number. Counter CTR1 provides the least significant bit for the count. A carryover C0 is provided to a second counter, CTR2 which provides output signals 45MSB. The signals 45LSB are supplied to driver DR1 (for example part no. CD4511) which converts the current LSB signal to a seven line output to drive the least significant digit readout segment SEG2 of a readout which displays the number of the function segment of EPROM 44 currently selected. The most significant bit 45MSB from counter CTR2 is supplied to a display driver DR2 which drives the most significant digit display segment 1 of the program select display. The binary signals 45MSB and 45LSB are also supplied to a decode device 44 such as an eraseable programmable read only memory device which provides the program select signal 41 to EPROM 20 which also receives the digital transducer signals 81 from ADC and generates the command signals CLSB and CMSB as previously described. The CLSB and CMSB signals are provided to latch 16 which provides the delayed command signals DCLSB and DCMSB as previously described.

The transmission occurs when latch 16 is gated. In the arrangement shown in FIG. 1B latch 16 is gated at a selected rate by a signal 75 from clock 60A. The example of Clock 60A shown in FIG. 1B includes a pair of Schmitt Triggers 62, 63, connected as shown to provide pulses on an output 65 at a rate determined by the setting of potentiometer P61 which supplies reference voltage to adjust the system time cycle. The pulses are supplied to flip flops part no. CD4013 where output 75 of flip flop 66 gates latch 16 at the rate determined by the setting of potentiometer P61. A visual indication of the rate is provided by LED 61 which is driven by flip flop 64 (which can also be a part no. CD4013). LED 61 is supplied from reference A through a dropping resistor R66 to flip flop 64 through a darlington transistor for example part no. MPSA14 where the transistor is gated by flip flop 64 at a rate determined by potentiometer P61.

The rate at which latch 16 is gated to transmit the CLSB and CMSB signals to comparators 11 and 12 is adjustable and within the scope of the present invention allows independent adjustment of the rate of correction of the central element such as a valve to compensate for the response time of the particular system to be controlled. The rate of correction also determines the control range. In general the rate of correction is usually equal to the response time of the system being controlled.

FIG. 1C illustrates other arrangement within the scope of the present invention where the program select switches 40 have been replaced by a programmable logic controller PLC 40 which can be utilized to control the process by adjusting the program select inputs 40 to select the response characteristic or process level for example as shown in FIGS. 2A-2C. In jthe arrangement shown PLC 40 receives the transducer signal 27 to adjust the selection of programs in response to the programmed logic of the controller.

Figure 2D:
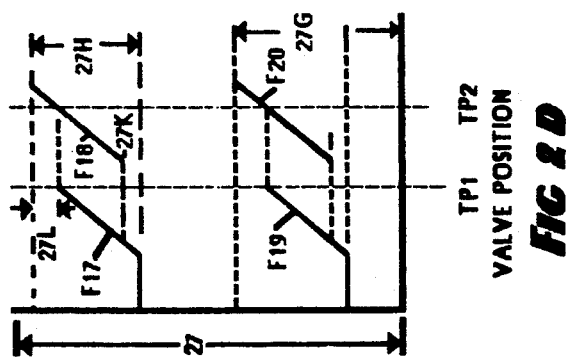

As also shown in FIG. 1C the position signals PLSD and PMSD can be supplied to a transfer point decode device TP10, for example a programmable read only memory device. Outputs TP1 and TP2 are provided from decode device TP10 to EPROM 20. In accordance withd one feature of the present invention the output signals TP1 and TP2 are used to shift the actuator program in EPROM 20 so the position output CLSD and CMSD is changed in response to the actual position of the actuator as illustrated in FIGS. 2D and 2F and 2E as described hereinafter.

Referring now to FIGS. 2A-2C, the vertical axis represents the signal 27 from the transducer 19. In a typical application, the signal could be a 4-20 mA signal, a 1-5 volt DC signal, or any other suitable signal.

As also shown in FIG. 1A and described hereinafter an amplifier A can be provided, where necessary, if the signal 27 from the transducer is a low level signal, to amplify the signal or to adjust the level of the signal or otherwise condition the signal to accommodate a particular signal level.

The horizontal axis of FIGS. 2A-2C reflects the command position signals such as delayed command signals DCMSD and DCLSD, the horizontal axis reflects the number of position increments generated by position transmitter 4 for example 0-50 positions. EPROM 20 can be programmed so the valve is open at either end and closed at the other.

In FIG. 2A the response characterizations F1-F5 between signal 27 the positions is determined by the programming of the EPROM 20. In FIG. 2A straight line functions F1-F5 are provided. For example, in the case, of the function F1 the valve would be closed until the signal level reached the point 27A at which time the valve would begin to open and be completely open by the time the signal reached level 27B. The particular curve F1-F5 on which the device operates is determined by the input digital signal from switch selector 40 (or the counter 40A of FIG. 1B). Thus if it is desired to maintain process control in the range represented by the curve F5 then selector 40 would be set to adjust the inputs of the EPROM 20 to provide the command position signals for the curve F5 in the signal range represented by curve F5. Operation would be shifted to the curve F5. In this manner the valve would not begin to open until the transducer signal had reached point 27D and would be fully open when the signal reached level 27E. Thus, it can be seen that a control function approximating proportional control is provided where several control ranges F1-F5 of the transducer signal 27 are programmed into the EPROM 20.

FIG. 2B illustrates another control format where functions F6-F9 are provided where a single range of control is provided but and different control characteristics are selected at program signal select 40.

FIG. 2C illustrates another set of control responses FIGS. F10-F13. It will be understood that other control formats will be used to accomplish other specific control objectives.

In each case when the control range and function has been selected the process condition is maintained within the range of the function. For example in the case shown in FIG. 2A for control function F1 the process is controlled so the signal is maintained between values 27A and 27B by operation of the valve between open and closed positions. Because the valve, or other element, can move through its full range in each control span of the transducer signal, for example between values 27A and 27B for function F1, highly responsive control is provided.

Again the control function, and the associated control span and process condition to be maintained as reflected by transducer signal 27 is selected by any appropriate means such as the switches as shown in FIGS. 1A and 1B or the programmable controller 40PLC in the arrangement shown FIG. 1C the selection from controller 40PLC is based on process signal feedback 27FB.

Referring to FIGS. 2D multiple range control function F17-F20 are shown. Control spans 27G, and 27H each represents a portion of the entire span of signal 27. Two response curves F17 and F18 are located in span 27H while curves F19 and F20 are located in span 27G. Control of the operation of the actuator occurs at a position TP. In FIG. 1C the position signals PLSD and PMSD are provided to a reference device TP10 for example a programmable read only memory where data lines TP1 and TP2 are provided to additional inputs of reference device 20. In the arrangement shown in FIG. 2D, when the outputs PLSD and PMSD from decode device 9 are in a selected range, for example above point TP the output TP1 is actuated to select a set of responses in EPROM 20 and when the position of the actuator 25 is below TP output $TP^1$ is "off" to select another set of responses in EPROM 20. EPROM 20 has been programmed with four control functions F17, F18 in span 27H and control functions F19, F20 within control span 27G.

When control span 27H is chosen by PLC 40 or switch 40, as the case may be, and the transducer signal 27 increases to the level 27 L so the position of the valve, or actuator, goes past position TP then output TPI is actuated and operation of the valve, or final control element, is transfered to control function F18. The valve then opens to position PA and the transducer signal 27. Since the valve has opened the singal 27 is reduced. When signal 27 goes below level 27K where the valve position goes below TP and output TPI is deactivated so operation of the valve returns to curve F17.

In effect when the control span 27H is selected, as the transducer signal increases the valve moves from closed position toward full open. As the valve position passes TP operation of the valve is transferred to control function F18. As a result the valve suddenly moves toward full open so the process condition will be rapidly corrected to lower the transducer signal which then causes the valve to move toward the closed position. As a result the process condition tends to move downward within the control span 27H. When the signal moves downward to level 27K the valve moves below position TP so the output TPI is deactivated and operation is transferred to control function F17. The overall effect is to maintain the process condition between transducer levels 27K and 27L.

As can be seen from FIG. 2D several control spans such as 27H-27L can be provided with two control functions in each span. While only two spans are shown it will be appreciated that the total number of spans and control functions is determined by the particular application and the capacity of the reference devices TP 10 and EPROM 20.

Another control scheme within the scope of the present invention is shown in FIG. 2E where two control ranges 27M and 27N are shown within the span of signal 27. In this case four control response functions are provided in each of the control spans. For example within control span 27N the operation transfers between control functions F21-F22-F23-F-24 at transfer positions TPA, TPB, TPC on rising or falling process signal.

Similar operation occurs in control span 27M. The position of the control span, for example 27M can be moved as shown by the span 27MA by adjustment of the response voltage to analog to digital converter ADC 80. This allows further adjustment of the control range.

Figures 3A, 3B, 3C, 4:
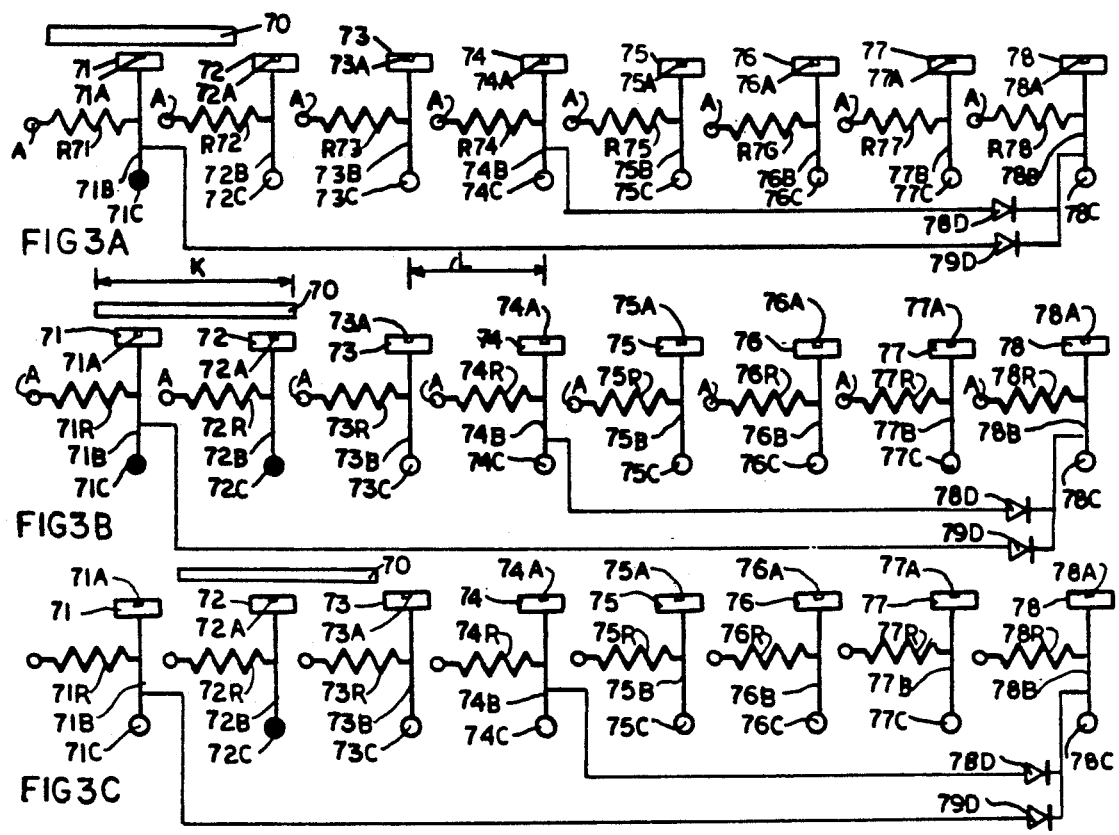
FIGS. 3A-3C are schematic illustrations of operation of a position indicator useful in the arrangement shown in FIGS. 1A and 1B.
FIG. 4 is a truth table illustrating the operating characteristics of the position indicator shown in FIG. 4.

FIGS. 3A-3C illustrate one example of an arrangement to provide indication of valve shaft position as can be provided by position indicator 4 of FIG. 1.

In FIGS. 3A-3C a magnet 70 is shown which would typically be carried by a rotor connected to shaft 2 of actuator 1 which can be bidirectionally operated as previously described.

In FIGS. 3A-3C Hall Effect sensors 71-78 are located in spaced relation in a linear path but in transmitter 4 of the example of FIG. 1 the sensors would be located in an arc parallel to the path of travel of magnet 70 with the shaft, for example in a 90° arc, all as illustrated and described in my copending application Ser. No. 268,381 filed Oct. 31, 1988.

It is further to be understood that the Hall effect sensors are actually actuated by a field of the magnet but for purposes of illustration only the magnet is shown. It is assumed the field, for example from the South pole of the magnet, is coextensive with the magnet.

In FIGS. 3A-3C the sensors 71-78 are shown in a linear path to be sequentially engaged by the field of magnet 70 which as previously stated for purposes of the present illustration is assumed to be equal to the width of the magnet. The orientation of the magnets relative to sensors 71-78 as shown in FIGS. 3A-3C illustrate an example of one arrangement suitable for a moving element which would carry magnet 70. To facilitate explanation of the operation of position transmitter 4, it will be understood that in the use of the principles discussed herein for a rotary moving element such as a shaft of a 90° turn rotary valve, the magnet would move through a 90° arc with movement of the actuator shaft. As is known in the art, when a field of appropriate polarity generated by magnet 70 is located proximate the sensing areas 71A-78A of sensors 71-78 the electrical characteristic of the sensor changes as a result of the well known Hall effect principles. In this case the sensor goes conductive and the change is reflected at the output(s) 71B-78B of the actuated sensor(s).

In the arrangement shown, positive pullup voltage A is supplied through resistors R12 to outputs 71B-78B of sensors 71-78 so the outputs are maintained "Hi" when the sensors 71-78 are nonconductive. Thus, only the sensing areas 71A-78A exposed to the field of magnet 70 will be actuated so the associated sensor goes conductive and those sensors will have "Lo" outputs since each output 71A-78A is conductive to ground through the detector.

Typically, as shown in FIG. 1 outputs of the position transmitter are connected to the address inputs of EPROM 9 to generate the position data signals PLSD and PMSD. In order to reduce the total number of data lines the outputs of selected sensor such as output 78B of sensor 78 can be connected by diodes 78D and 79D to for example output 71B, 74B so these outputs and the corresponding address inputs of EPROM 9 are actuated by the actuation of sensor 78.

In accordance with the example shown, magnet 70, and more importantly the associated magnetic field which for descriptive purposes is assumed is coextensive with the length of the magnet, has a length K which is greater than the spacing L between the sensing areas of adjacent sensors so that at least one sensor is always actuated and two of the sensors are alternately actuated as described hereinafter.

For example, FIG. 3A illustrates the case where the field magnet 70 is located only over the sensing area 71A of sensor 71 so sensor 71 is conductive and output 71B is Lo as indicated by indicator 71C. Indicators 72C-78C indicate outputs 72B-78B are Hi.

In FIG. 3B magnet 70 has moved to a position over the sensing areas 71A, 72A of sensors 71, 72 so the outputs 71B, 72B are low as indicated by the indicators 71C, 72C which are Lo while the balance of the outputs 73-78 are Hi.

FIG. 3C illustrates the case where magnet 70 has moved over the sensing area of sensor 72 so only output 72B is low.

The effects of the movement of magnet 70 through the entire length of travel is shown in FIG. 4 where the presence of a Lo at the output from sensor 71-78 is shown as "0" and the outputs 71B-78B which are Hi are reflected by "1". It will be seen that for each of the fifteen position (0-14) which can be determined by the arrangement shown a different 8 bit binary word is obtained.

As previously discussed with reference to FIG. 1, the outputs 71B-78B from transmitter 4 of FIG. 1 are provided by means of a multiconductor lead 8 to a signal decoder 9, for example, an Eraseable Programmable Read Only Memory EPROM 9. While the signals could be utilized in the form provided by outputs 71B-78B. In the example shown the signals are modified to generally sequential order and to match the range and format of binary signals provided by EPROM 20 which, in the illustrated case, provides an eight bit binary word at the outputs PLSB and PMSB. Examples of the state of outputs 71B-78B for a series of positions are shown in FIG. 4 where the effects of actuation of sensor 78 and diodes 78D and 79D is shown. That is when output 78B is actuated as shown by "X" the diodes cause outputs 71B, 74B to go "lo" as shown by "0".

In summary, the valve position signals are supplied to EPROM 9 which supplies binary words in selected chronological order to comparators 11 and 12 to be matched with the output from EPROM 20.

In addition to the position transmitter arrangement shown in FIGS. 3A-3C other position transmitter arrangements can be used within the scope of the present invention to generate digital position signals.

For example FIGS. 5A-5H, 6, and 7 illustrate yet another arrangement within the scope of the present invention for multiple actuation of sensors in a sensor set by two, or more actuation devices. In this case two magnets, for example as shown in FIG. 6 magnets 81, 82 carried by an element 83 which is moved with movement of a device such as the shaft of an actuator as shown in FIG. 1 can be used where the sensor set is located in a single path parallel to the path of travel of the magnets and element as shown in FIGS. 5A-5H.

Referring to FIG. 5A, sensors 86-89 are illustrated and located in a travel path. Each of the sensors, respectively, has a sensor actuation area 86A-89A. In the arrangement shown two actuation devices, for example, magnets, 81A and 82A as shown in FIG. 6 are located to provide actuation spans 81 and 82 which in the case are magnetic fields of a appropriate polarity to actuate the sensors 86-89 when one of the magnetic fileds engages the actuation area of the sensor.

As previously described by proper sizing of the actuation spans 81A, 82A, in the case the field, and the spacing between the actuation spans of the magnets, a unique pattern of digital signals can be developed from one sensor set which is indicative of the position of the element which carries the magnets to allow enhanced use of a fewer number of sensors.

The actuation areas of the sensors, as shown, are separated by a distance L10. The actuation span 81A of magnet 81 has a length L11 which is greater than the distance L10 and typically is 1.25 (L11). Magnet 82 has an actuation span 82A having a length L12 which is less than the distance L10 and typically is equal to 0.75 (L10).

The actuation span of the magnets can be related to L10 so that in general the length L11 of the actuation span 81 of magnet 81A can be greater than L10 and can be equal to $[N_2(L10)+X]$ where "$N_2$" is a whole integer "X" and is a distance less than L10, for example, 1.25 (L10).

A spacing L13 can be provided between the spans 81, 82 of the magnets 81A, 82A, where the spacing is selected to facilitate the proper generation of signals and it too can be a function of L10, or a number of increments of L10, where the distance L13 is, in general equal to $[N_3(L10)+D]$ where N is 0, or a whole integer and where "D" is less than L10. For example in the arrangements shown in FIGS. 8A-8G N is 0 and D is 0.5 (L10).

Likewise the length L12 of the span 82 can be equal to $[N_4(L10)+S]$ where $N_4$ is "0" or a whole integer and "S" is a distance less than L10 for example 0.75 (L10) and in FIGS. 5A-5H $N_4$ is 0 and S is 0.75 (L10).

The arrangments shown generate a set of signals shown in FIG. 7 as positions 5A-5H which are generally equally spaced and of width determined by where the sensors 86-89 turn on and off as the magnet spans engage and disengage the sensor actuation areas 86A-89A.

FIGS. 5A-5H illustrate successive positions of an element 83 as it progresses in a direction of movement as shown.

For example, in FIG. 5A the actuation span 81 engages the sensing area 86A of the sensor 86 and the actuation span 82A of magnet 82 engages the sensing area 87A of sensor 87.

In FIG. 8B the magnets 81, 82 have moved to the right so that the actuation span 81A of magnet 81 engages the sensing area 86A of sensor 81 but the actuation span 82 of magnet 82 does not engage a sensor.

In FIG. 5C the element has moved further in the same direction so that the actuation span 81A of magnet 81 is still in engagement with the sensing area 86A of the sensor 86 and the magnet 82 has moved to the point where span 82A engages the sensing area 88A of the sensor 88. At this point the sensor 87 is not engaged by the magnetic field of either magnet.

In FIG. 5D the magnet 81 has moved to the point where the span 81 engages the sensing areas 86A, 87A of sensors 86, 87 and the field 82A of magnet 82 engages the sensing area 88A of the sensor 88.

In FIG. 5E the field 81A of magnet 81 has progressed to the point where it has become disengaged from the sensing area 86A of the sensor 86, but still engages the sensing 87A of the sensor 87 and the field 82A of the magnet 82 is still in an engagement with the sensing area 88A of the sensor 88.

Then in FIG. 5F the field 81A of magnet 81 is in engagement with the sensing area 87A of sensor 87 while the field 82A of magnet 82 has become disengaged from the sensing area 88A of the sensor 88.

The progression continues through FIG. 5H whereby a binary truth table is developed as shown in FIG. 7 illustrating various position of the element and the sensors actuated for each position. It can be appreciated from the truth table that each position has generated a unique binary word indicative of that position.

FIG. 6 is an illustration of a actuator element useful in devices of the type illustrated in FIGS. 5A-5G where the moveable element 83 is shown with the magnet 81 which provides the field or span 81A and magnet 82 which provide the field or span 82A also shown.

The space L13 in the arrangement shown in FIG. 6 is occupied by a magnet 84. Magnets 81, 82 can have one pole, for example, a south pole directed outwardly (in arrangements where the actuation areas 86A–894A of sensors 86–89 are actuated by south pole) and the space corresponding generally to the distance L13 can be occupied by magnet 84 as shown where the magnet 84 is turned to expose an opposite, in this case north, magnetic field of proper width to the sensors. It has been found that such an arrangement can also provide an efficient means of setting limits on the extent of the magnetic fields.

It will be understood that if desired the outputs of selected sensors can be connected by means of diodes to outputs of other sensors as previously discussed with reference to the example of FIG. 3.

FIGS. 8A-8N, 9 and 10 illustrate yet another arrangement within the scope of the present invention utilizing four actuator devices, for example magnets of selected magnetic field widths to actuate a row of sensors.

In the arrangements shown in FIGS. 8A-8N sensors 281-285 are shown and are located as previously described with reference to the other arrangments.

The sensors 281-285 have actuation areas which in the FIGS. 8A-8N are represented by the dotted lines 281A-285A showning that the actuation areas are approximately in the centers of the sensors.

The sensors 281-285 are mutually separated by a distance L20 as shown in FIG. 8A.

The connections of the sensors are typical of the type previously shown where certain of the sensors can be interconnected or where the sensors are connected directly to decode devices and can be provided with positive or negative pull up depending upon the characteristics of the particular sensor in the mode of operation.

Actuators spans 291-294 are provided, which can for example be a actuation span of a selected pole of a magnet of proper dimension for the actuation of the sensors 281-285.

The spans 291-294 respectively have lengths L21, L23, L25, and L27 as shown and the actuator spans are separated by the distances L22, L24, and L26.

Typically as previously described the proper actuation span and spaces between the actuation spans are functions of the distance L20 and the distances L25, L26 and L27 are of the same character as those shown in FIGS. 5A-5H.

The additional spans 291 and 292 added in the present instance are mutually separated and are separated from the span 293. In each case the general formula for the distance is: [NL+(a distance less than L)] for example, in the arrangement shown the spans 293 and 294 are similar to the spans shown in FIG. 8A et. seq. while the distance L24 is ¾L the distance L23 is ¼L, the distance L22 is ¼ L20, and the distance L21 is ¼ L20.

On the movement of an element which carries the actuator which generates the spans 291-294 in the direction shown in the FIGS. 8A-8N the truth table shown in FIG. 13 is generated and it will be noted that for each position a different binary code has been generated indicating the different positions within the different positions of the device. It will be known that with only five sensors a total of more than 14 positions (and theoretically up to 8 positions per magnet) can be generated. In the arrangement shown the postions are shown by the marks 302 which correspond to the leading edge of the span 294 at the generation of each additional position and the bracket 301 indicates that the positions are generated sequentially as the actuator span generators move in the direction shown.

Again FIG. 9 is an illustration of an element 290 which can be provided to be connected to the moveable element such as a shaft and which carries the magnets 291A-294A which generate the spans 291-294.

As previouly described the spaces L22, L24, and L26, can be filled by means of magnets 295, 296, and 297 which are inverted with respect to the polarity of the magnets 291A-294A or may be vacant. As previously described the arrangement accomplishes specific "turn on" and "turn off" of the sensors in response to movement of the element.

FIGS. 11-14 illustrate other arrangements within the scope of the present invention utilizing different numbers of magnets. In FIGS. 11-14 the sensors 311-319, 321-329, 331-339, and 341-349, are located in spaced apart relation a distance L30 on the locater lines 369-373. It will be understood that each of the arrangements shown in FIGS. 11-14 is a separate arrangement but the arrangements have been shown on equal centers to facilitate description and particularly to allow common usage of the distance L30 upon which the distances are computed.

As previously described each of the sensors 311-319 is provided with a sensing area 312-320 while the sensors 321-329 are provided with sensing areas 322-330 and so forth.

In FIG. 11 four magnetic fields 352, 353, 354, and 355 are provided by magnets (not shown) carried by a movable element 351 which is carried by a shaft or other device where position is to be indicated.

The distances L31, L33, L35, and L37 represent the lengths of the magnetic field 352-355 while the distances L32, L34, and L36 represent the spacings between the magnets. In FIG. 14 the distances, which have been found to provide a workable system to provide approximately eight positions for each of sensors are:

| | |
|---|---|
| L31 | 1.25L |
| L32 | .375L |
| L33 | .25L |
| L34 | .25L |
| L35 | .25L |
| L36 | .375L |
| L37 | .75L |

The distances between the magnet 352 to the other magnets can than be computed by the distances L32, L38, and L39 has integral numbers of the distance L30 and a fraction thereof.

In FIG. 12 a system is shown which has been found to satisfactorily indicate the position of the movable element 366 where approximately six positions are provided per sensor and where the distances of the magnetic field 356–359 are longer than in FIG. 11 and where the magnets are rearranged in that the longest and the second longest magnets are located intermediate the shorter magnetic fields 356 and 359 which are located on the outer edges of the movable element 366. The magnet lengths correspond to the distances L40, L42, L44, L46 while the spacings between the magnets correspond to the distances L41, L43, and L45.

The distances as shown can be in the following ratio with respect to the distance L30 are:

| | |
|---|---|
| L40 | .5(L30) |
| L41 | .375(L30) |
| L42 | 1.25(L30) |
| L43 | .5(L30) |
| L44 | .75(L30) |
| L45 | .5(L30) |
| L46 | .5(L30) |

FIG. 13 illustrates an arrangement where approximately four positions are provided by each of the sensors and where three magnetic fields are utilized the only difference being that the spacing is not quite as regular as with respect to the previously described systems.

In FIG. 13 magnet fields 360–362 are provided by magnets (not shown) where the distances illustrated are for the magnet fields L47, L49, L51 in the spaces between the magnets are represented by the distances L48, and L50.

It will be understood that as previously described and also with reference to FIGS. 11, and 12 inverted pole magnets can be provided in the intermeidate spaces in order to provide sharper resolution.

In the arrangement shown in FIG. 13 the distances can bear the following relationships:

| | |
|---|---|
| L47 | 1.25(L30) |
| L48 | .5(L30) |
| L49 | .75(L30) |
| L50 | .5(L30) |
| L51 | .25(L30) |

Finally, with respect to FIG. 14 yet another arrangement within the scope of the present invention is shown which provides similar characteristics to the arrangements shown in FIG. 13 except that the width of the magnetic fields are slightly different and the relationship can be as follows:

| | |
|---|---|
| L52 | 1.25(L30) |
| L53 | .5(L30) |
| L53 | .75(L30) |
| L54 | .625(L30) |
| L55 | .5(L30) |
| L56 | |

It has been found that the arrangement shown here facilitates the switching of the sensors at more precise positions thus enhancing the overall operation of the device and providing even better position resolution and uniformity.

Position transmitter arrangements illustrated in the accompanying drawings provide good results when used in devices in accordance with the present invention because as the element moves from one segment to the next, at least one sensor actuated in the first segment remains actuated when the actuation means moves to the next segment and one of the sensor means which was engaged in the first segment by one of the actuation means is disengaged in the next segment or a sensor which was inactive in the prior segment is activated. Proper sequencing is obtained by proper interrelation of the spacing and location of the actuation lengths of the actuation devices with reference to spacing between sensors.

In accordance with another feature of the present invention it has been found that the mode of digital control operation previously described with reference to position determination by magnetic devices is equally appropriate for use in optical devices which can also be utilized in digital position transmitters for control devices in accordance with the present invention.

FIG. 15 is a schematic illustration of an example of an arrangement within the scope of the present invention utilizing an example of an optical system where sources or sources of electromagnetic energy such as infraed or visible light sources 351 are located in spaced relation on one side of slotted shutter 350. Slots 353, 354, 355, and 356 are provided in shutter 350 in appropriate length and spacing to operate as actuation means similar to the magnets in the prior examples as described hereinafter.

In the arrangement shown the length of the slots is selectively determined as described hereinafter to allow light beams from the sources 351 to pass through the apertures as the shutter moves along a path indicated by the arrow M in a pattern so that different sensors are actuated by the light passing through different slots for each increment of travel of the element which carries the shutter. Sensors, or detectors, 361–368 suitable to be actuated by the energy emitted from the sources 351 are provided on the opposite side of the shutter 350 and in aligned relation with the sources 351 to receive a beam of light which is directed through the slot when a shutter slot is in a selected aligned position with the source and detector.

For example in the arrangement shown in FIG. 15 the shutter is in position so the light beams pass through the aperture 354 and 356. As described with reference to previous embodiments of arrangements within the scope of the present invention the slotted shutter 350 can be carried by a element moveable between limits and the position of the element between the limits is indicated in increments of the travel path by the position of the shutter 350 as determined by the light beams passing through the shutters. Also the slots are of appropriate length and spacing to provide the desired resolution where the length and spacing of the slots is measured parallel to the travel path M and the slots, detectors and sources are located in paths to provide relative parallel movement as the element (not shown) moves along the travel path.

As previously described the output signals from the detectors 361-367 are provided to a decode device 9, for example, an Erasable Programmable Read Only Memory. Digital outputs PLSD and PMSD can be provided from the decode device to indicate the position of the element within the path of travel to be used as previously described to facilitate positioning of the element.

As also previously decribed with reference to previous arrangements, and in order to further reduce the number of conductors necessary to transmitt signals selected of the detectors, for example in this case detector 368, having and output 379 can be provided through diodes D363, 364 to other of the outputs, in this case the output 371 of detector 361 and the output 376 of detector 366 in order to generate digital numbers from detectors which are not directly connected to the decode device. Also the input transmission lines 371-277 which are connected to the decode device can be biased from power supply A through resistors R371-R377 respectively to maintain the signal level on the input transmission lines when the no detector connected to the signal transmission line is in the active state.

Figure 18:
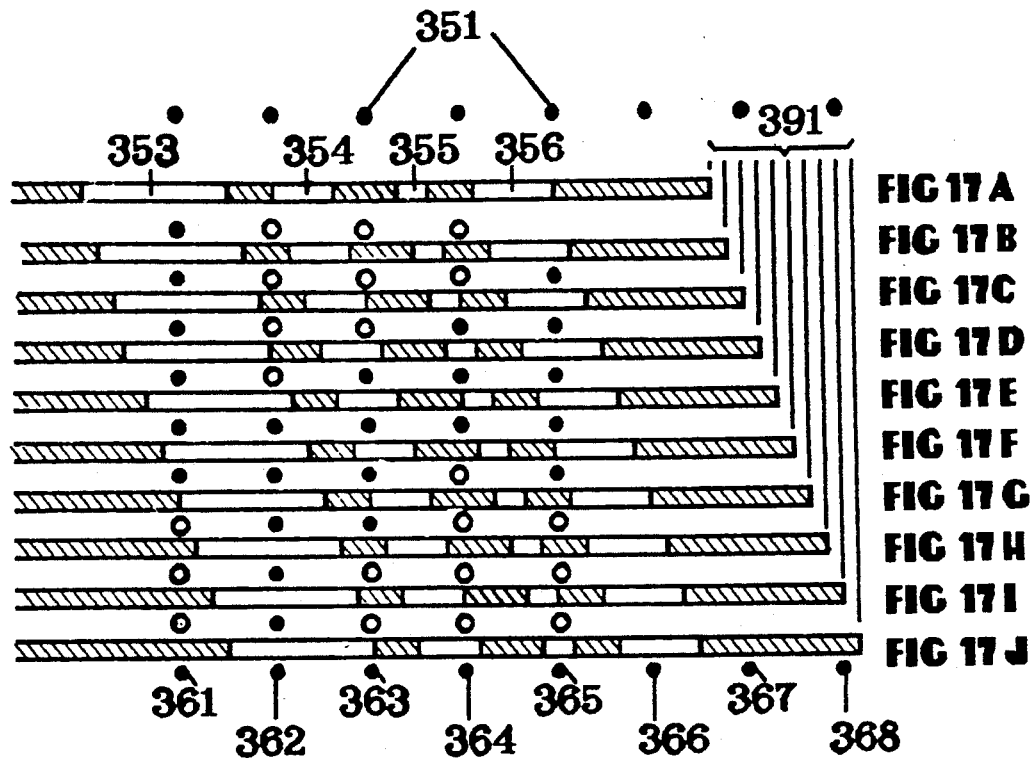

FIGS. 16A-16C illustrate shutter arrangments within the scope of the present invention as previously described where the length of the slots in the shutter arrangement is the a function of distance L40 between the detectors, in this case between the associated detectors 361-368 and the light sources 351 as shown in FIG. 17A which is a cross sectional view of the arrangement shown in FIG. 18 and where the different sequences of a shutter of the type shown as shutter 350 are illustrated. In the arrangements shown in FIG. 19A a shutter having two slots 382, 383 is shown where the length of the slot 382 is equal to L50 while the space between the two slots is L51 and the length of the aperture 383 is L52. The length L50 in the arrangement shown can be equal to 1.25 (L40) while the length L51 is 0.5 (L40) and the length L52 is 0.75 (L40).

FIG. 16B is an illustration of a shutter of the type shown in FIGS. 15 and 20A-20J where four slots 353-356 having lengths L53, L55, L57, and L59 with spacings L54, L56, and L58 between are provided in the shutter 357 and where the following relationships apply.

| L53 | 1.25(L40) |
| L54 | 0.5(L40) |
| L55 | .625(L40) |
| L56 | .75(L40) |
| L57 | .375(L40) |
| L58 | .375(L40) |
| L59 | 0.75(L40) |

It will be understood that in this arrangement as in others described herein other length and spacing relationships are useful and for example either the length or spacing can be increase by any multiple of the distance between the detectors and provide the same results.

Finally, in FIG. 16C is an illustration of a shutter 386 having slots 387-389 located therein where the following relation applies where L60 is the length of the aperture 387, L61 is the length of the space between slots 387 and 388, length L62 is the length of aperture 388, length L64 is the length of the distance between apertures 388 and 389 and L65 is the length of aperture 389. The following relationships apply in this case:

| L60 | 1.16(L40) |
| L61 | .33(L40) |
| L62 | .388(L40) |
| L64 | .5(L40) |
| L65 | .33(L40) |

It will be understood that in arrangements within the scope of the present invention a single light source could be utilized or the light sources can be utilized with columnated lenses in order to focus the light where appropriate as well as arrangements where the actuation means is a reflective strip and the source is located to reflect light or other electromagnetic radiation off the reflective strip to the detector to indicate position of the element.

Additionally, other aperture arrangements also within the scope of the present invention will occur to those skilled in the art upon reading the disclosure set forth hereinbefore.

Referring now to FIGS. 23A-23J sequential movement of the aperture sheet 357 through a portion of its range are illustrated. The detectors 361-368 are also illustrated where filled in detectors indicate the detector is on and the light beam is being directed from the source 351 through an aperture 2 and received by the detector. Where open circle detectors are illustrated the indication is that a light ray is not being received.

Additionally, the increments of movement are shown collectively by the reference numeral 391 at the ends of the extension lines drawn from the end of the aperture sheet at the end of each position.

The overall positioning and actuation pattern is shown in the truth table of FIG. 24 for the various positions 26A-26J where an "X" indicates that the detector is on while a "0" indicates that the respective detectors are off. Thus, the pattern of actuation of the detectors is clearly illustrated.

The invention claimed is:

1. A control device to position shaft means operated by actuator means and moveable between first and second limits to operate process regulator means to control a process condition including;

a. process transducer means to provide a process signal indicative of the status of the process condition to be controlled;

b. position indicator means to generate binary coded position signals in selected format to indicate the position of said shaft means between said first and second limits in increments of the travel path of said shaft where a different binary coded position signal is generated for each segment of travel path and the binary coded position signals are incremented as said shaft moves in said travel path in first direction toward said first limit to operate said process regulator means to adjust said process condition in a first direction and said binary coded postion signals are decremented as said shaft moves in said travel path in a second direction toward said second limit to operate said process regulator means to adjust said process condition in a second direction;

c. digital process signal generator means having input means to receive said process signal and output means to provide binary coded process signals in sequential order in the same range as said binary coded position signals where said binary coded process signals each indicates a position are indicative of the magnitude of said process signal;

d. binary coded number comparator means having first signal input means to receive said binary coded process signal, second signal input means to receive said binary coded position signals, first output means to provide an equal comparator signal when said binary coded process signal received at said first signal input means and said digital binary coded position signal received at said second signal input means are equal, first mismatch signal means to provide first mismatch signal when said binary coded process signal received at said first signal input means exceeds said binary coded position signal received at said second signal input means and second mismatch signal means to provide second mismatch signal when said binary coded position signal received at said second signal input means exceeds said binary coded process signal received at said first signal input means;

e. register means to receive said binary coded process signal with clock means to select the frequency at which said process signal is supplied to said first input of said comparator means;

f. motive supply means to provide motive means to operate said actuator means to move said shaft and regulator means in said first and second directions;

h. motive means control means to receive said equal signal, said first mismatch signal and said second mismatch signal and operate said actuator means to move said element in said first direction in response to said first mismatch signal and operate said actuator means to move said element in said second direction in response to said second mismatch signal.

2. Control device to position shaft means operated by actuator means and moveable between first and second limits to operate process regulator to control a process condition means including;

a. process transducer means to provide a process signal indicative of the status of the process to be controlled where said process signal is within a process signal range;

b. position indicator means to generate binary coded position signals in selected format to indicate the position of said shaft means between said first and second limits in increments of the travel path of said shaft where a different binary coded position signal is generated for each segment of travel path and the binary coded position signals are incremented as said shaft moves in said travel path in first direction toward said first limit to operate said process regulator means to adjust said process condition in a first direction and said binary coded postion signals are decremented as said shaft moves in said travel path in a second direction toward said second limit to operate said process regulator means to adjust said process condition in a second direction;

c. digital process signal generator means having input means to receive said process signal and output means to provide binary coded process signals in sequential order in the same range as said binary coded position signals where said binary coded process signals each indicates a position increment of said shaft and said binary coded process signals are indicative of the magnitude of said process signal;

d. decode means to receive said binary coded process signal and generate at least one set of sequential binary coded command position signals within a control span defined within a portion of the total range of said process signal.

e. binary coded number comparator means having first signal input means to receive said binary coded command position signal, second signal input means to receive said binary coded position signal, first output means to provide an equal comparator signal when said binary coded process signal received at said first signal input means and said digital binary coded position signal received at said second signal input means are equal, first mismatch signal means to provide first mismatch signals when said binary coded process signal received at said first signal input means exceeds said binary coded position signal received at said second signal input means and second mismatch signal means to provide second mismatch signal when said binary coded position signal received at said second signal input means exceeds said binary coded process signal received at said first signal input means;

e. motive supply means to provide motive means to selectively operate said actuator means to move said shaft and regulator means in said first and second directions;

g. motive means control means to receive said equal signal, said first mismatch signal and said second mismatch signal and operate said actuator means to move said element in said first direction in response to said first mismatch signal and operate said motive means to move said element in said second direction in response to said second mismatch signal.

3. The invention of claim 2 including register means with latch means to receive said binary coded position command signal and transmit the then current digital binary process signal to said first comparator input at selected intervals.

4. The invention of claim 2 wherein said decode device generates multiple control spans within the range of said process signal.

5. The invention of claim 2 wherein said decode means generates at least first and second sets of binary coded command position signals within each said control span; said decode means includes switch input means to receive said binary coded position signal and where the binary coded command position signal provided by said decode means to said comparator means in switched between said first and second sets of binary coded command position signals in response to selected change in said binary coded command position signals.

6. The invention of claim 2 wherein said decode means includes decode adjustment means where the position of said control span within said process signal range.

7. The invention of claims 1 and 2 wherein said position indicator device to generate multidigit binary signals to indicate position increments of said shaft between said first and second limits along a travel path includes a selected number of sensors located in a sensor travel path where each sensor has an actuation area and each sensor is operable between first state in response to presence of sensor actuation means in said sensor actuation area and second state in absence of said actuation means in said actuation area; where said actuation means includes first sensor actuator means having first actuation length parallel to said sensor path and disposed to selectively engage the actuation areas of said sensors to actuate respective sensors to said first state where said sensors are located so there is a distance "L" between said actuation areas of adjacent sensors and where said first actuation length is equal to $(n+\frac{1}{2})L$ where "n" is an integer having a value of at least one and where said first actuator means and said sensor means are moved relative to each other with movement of the movable element along said travel path so that said first sensor actuator means continuously engages the actuation area of at least one sensor and alternately engages the sensor actuation area of at least two adjacent sensors to provide a first multidigit binary output signal according to the state of all said sensors when a first sensor of a first set of adjacent sensors is engaged by said first sensor actuator and a second multidigit binary output signal is provided according to the state of all said sensors when the first sensor of said first set of adjacent sensors and a second sensor adjacent the first set of sensors is engaged by said first sensor actuator means, a third multidigit binary output signal is provided according to the state of all said sensors when said first sensor actuator means disengages from one sensor of said first set of sensors but remains in engagement with the actuation area of the second sensor to indicate positions of said element in said travel path in increments of said travel path.

8. The invention of claims 1 and 2 wherein said position indicator device for indicating the position increments of said shaft between said selected limits along a travel path includes a set of sensors including at least first, second, third and fourth sensors located in a sensor path where each sensor has an actuation area and each said sensor has output means operable between first state in response to presence of actuation means in said actuation area and second state in the absence of said actuation means in said actuation area; at least first and second sensor actuator means carried for movement parallel to said sensor path with first and second actuation means respectively to selectively engage actuation areas of said sensors where said sensors are located so there is a distance "L" between the actuation areas of adjacent sensors, measured parallel to said sensor path, and where said first actuation means has a first actuation length parallel to said sensor path equal to $[NL+X]$ where "N" is 1 or a whole integer and "X" is less than "L" and said second actuation means provides second actuation length, measured parallel to said sensor path, equal to $[(N_2)L+S]$ where $N_2$ is 0 or a whole integer and "S" is less than "L" but not equal to "X" and where said first and second actuation means are separated by a first distance "SD" equal to $[(N_3)L+D]$ where $N_3$ is "0" or a whole integer and "D" is less than "L" and not equal to "X" or "S" and the sensors and said first and second actuation means are moved relative to each other with movement of the shaft so that in each movement of said element from one increment of said travel path to a second increment of said travel path one sensor which is actuated by one of said first and second actuation means remains actuated by one of said first and second actuation means while a second sensor is engaged or disengaged by one of said first and second actuation means, and the state of all said sensors provides a multidigit binary number to indicate the then current incremental position of the element in the travel path so that as said moveable shaft moves in a first direction along said travel path:

a) said first actuation means engages said actuation area of a first sensor while said second actuation means engages the actuation area of second sensor in a first position then as said shaft moves to a second position;

b) said first actuation means engages the actuation area of said first sensor, said second actuation means is disengaged from the actuation area of said second sensor then as said shaft moves to a third position;

c) said first actuator actuation means engages the actuation area of said first sensor means and said second actuation means engages the actuation area of a third sensor, then as said shaft moves to a fourth position;

d) said first actuation means engages actuation areas of said first and second sensors while said second actuation means engages said actuation area of said third sensor then as said shaft moves to an fifth position;

e) said first actuation means disengages from said actuation area of said first sensor and remains engaged with said actuation area of said second sensor while said second actuation means remains engaged with said actuation area of said third sensor means, then as said shaft moves to a sixth position;

f) said first actuation means engages the actuation area of said second sensor and said second actuation means disengages from said actuation area of said third sensor.

9. The invention of claim 8 including at least said first, second, third, and fourth sensors and further including at least fifth and sixth sensors as well as at least first, second, third and fourth signal transmission means connected respectively to output signal means of said first, second, third and fourth sensor means to transmit signal states of said first, second, third, and fourth sensor output signals; signal maintenance means to normally maintain said at least first, second, third and fourth signal transmission means in said second states; signal flow direction limiting means connecting said output signal means of said sixth sensor to at least two of said first, second, third and fourth signal transmission means so said at least two of said first, second, third and fourth signal transmission means to which said sixth sensor signal output means is connected by said signal flow direction limiting means, are each operated to said first state when the output of said sixth sensor goes to said first state and are also operated to said first state by said output signal means of the respective first, second, third and fourth sensors to which the first, second, third, and fourth signal transmission means are connected and where the two of said first, second, third and fourth sensors having their output signal means connected to said signal transmission means to which said signal flow direction limiting means from said signal output means of said sixth sensor are connected are not located in said sensor path within two sensors of each other and neither of said at least two of said first, second, third, and fourth sensors is adjacent said sixth sensor whereby said at least two of said first, second third and fourth signal transmission means connected to said output signal means of said sixth sensor by said signal flow direction limiting means go to said first state when said output signal means of said sixth sensor is in said first state, and said signal flow direction limiting means prevents the occurrence of a first state signal on either of said at least two of said first, second, third or fourth signal transmission means connected to said sixth sensor by said signal flow direction limiting means from being transferred to other of of said at least two of said first, second, third, or fourth signal transmission means to which the output signal means of said sixth sensor is also connected by said signal flow direction limiting means.

10. The invention of claims 1 and 2 wherein said device to generate multidigit binary signals to indicate the position of an element movable bidirectionally between selected limits along a travel path in generally equal increments of the travel path includes a selected number of selected energy sensitive sensors elements located in a sensor path where each sensor is actuated to first state in response to receipt of selected actuation energy and goes to second state in absence of said actuation energy; actuation energy source means to direct selected actuation energy to each said sensor; first actuator means, having first actuation means with first selected actuation length parallel to said sensor path, to allow transmission of said actuation energy from said source means to said sensor means when said actuation means is within selected locations relative to said sensor path to actuate respective sensor means to said first state where there is a distance "L" between said adjacent sensor means and where said first actuation length is equal to $(n+\frac{1}{2})L$ where "n" is an integer having a value of at least one and where said first actuation means and said sensor means are moved relative to each other with movement of said shaft so that said first actuation means continuously allows transmission of energy to at least one sensor means and alternately allows energy transmission to the sensor actuation area of at least two adjacent sensors to provide a first multidigit binary output signal according to the state of all said sensors so a first multidigit binary signal is generated by the state of all said sensors when a first sensor is engaged by said first actuation means and a second multidigit binary output signal is provided according to said state of said sensors when the first sensor of said first set of adjacent sensors and a second sensor adjacent sensors is engaged by said first actuation means, a third multidigit binary output signal is provided according to said state of said sensor means when said first actuation means is moved to prevent transmission of energy to first sensor means but allows transmission of energy to said second sensor means to indicate positions of said element in said travel path in increments of said travel path.

11. The invention of claim 10 wherein said source means and said sensor means are located in generally aligned relation said actuation means is an aperture transparent to said selected energy having a length equal to $(n+\frac{1}{2})L$ in a shutter means made of a material opague to transmission of said selected energy having a length greater than the length of said sensor set.

12. The invention of claim 11 wherein said selected energy is electromagnetic radiation.

13. The invention of claim 10 wherein said selected energy is magnetic flux.

14. The invention of claims 1 and 2 wherein said device for indicating the position of a said shaft adapted to travel bidirectionally in a travel path between first and second limits where the position of the element in said travel path is indicated in generally equal segments of the first travel path including:
  a) sensor set means including at least first, second, third, fourth, and fifth selected energy sensitive sensor means disposed in generally equal, mutually spaced, relation along a sensor path where said first, second, third, fourth, and fifth sensors are operable between first state, in response to selected energy and second state, in the absence of said selected energy where each sensor means includes output signal means to provide first and second output signals in response to said first and second states of said sensor means; and
  b) Selected energy source means to direct selected energy;
  c) first sensor actuation means carried by said movable element for movement in a third path parallel to said sensor path in response to movement of said shaft between said first and second limits where said actuation means actuation length parallel to said sensor path to allow transmission of said selected energy from said source means to said sensor means when said actuation means is within selected locations relative to said sensor path sensor means to said second state where said actuation length is greater than the distance between two adjacent sensors and less than the distance between of said first and third sensor means where said actuation means is positioned first to transmit said selected energy to only one sensor means then to the one sensor means and to an adjacent sensor means, then the only to the adjacent sensor means to operate said sensor means output means between said first state and second states whereby said actuation means sequentially engages the only said first sensor means then engages said first and second sensor means, than engages only said second sensor means than engages said second and third sensor means then engages only said third sensor means then engages said third and fourth sensor means then engages only said fourth sensor means then engages said fourth and fifth sensor means then engages only said fifth sensor as said movable element moves in a first direction in said first travel path whereby said output means provide multidigit binary signals to indicate the position of said movable element in said travel path in segments of said travel path.

15. The invention of claims 1 and 2 wherein said device for indicating the position said shaft includes selected energy sensitive sensor means including at least first, second, third and fourth sensor mean located in a sensor path where each said sensor means has output means operable between first state in response to exposure of said sensor to electromagnetic radiation and second state in the absence of said selected energy; first and second sensor actuator means moveable with said shaft means having first and second actuation means to selectively actuate respective sensor means where there is a distance "L" between adjacent sensor means measured along said sensor path and where said first actuation means has a first actuation length parallel to said sensor path to cause operation of said sensor means to said first state equal to $[NL+X]$ where "N" is 1 or a whole integer and "X" is less than "L" and said second actuation means has second actuation length, measured parallel to said sensor path to cause said sensor to be actuated to said first state, equal to $[(N_2)L+S]$ where $N_2$ is 0 or a whole integer and "S" is less than "L" but not equal to "X" and where said first and second actuation means are located along a line parallel to said sensor path and are separated by a first distance "SD" equal to $[(N_3)L+D]$ where $N_3$ is "0" or a whole integer and "D" is less than "L" and the sensors and said actuator means are moved relative to each other parallel to said sensor path with movement of said shaft so that as said actuation means is moved from one segment of said travel path to the next at least one of said first and second actuation means which was actuated in the previous segment remains actuated so the state of all said sensor means provides a multidigit binary number to indicate incremental position of the shaft in the travel path.

16. The invention of claim 15 wherein said source means and said sensor means are located in generally aligned relation said actuation means is an aperture having a length equal to $(n+\frac{1}{2})L$ in a shutter means made of a material opague to transmission of said selected energy having a length at least equal to the length of said sensor set.

17. The invention of claim 15 wherein said actuation means is a material which is reflective of said electromagnetic radiation which is carried along a second path generally parallel to said sensor path and said source and said sensor means are located so that when said actuation means is in selected locations along said second path electromagnetic radiation from said source means is reflected to said sensor means by said material.

18. The invention of claim 15 wherein said selected energy is electromagnetic radiation.

19. The invention of claim 15 wherein said selected energy is magnetic flux.

20. The invention of claim 15 including at least first, second, third and fourth, fifth and sixth sensors each having signal outputs means where said first, second, third, fourth, fifth, and sixth sensor means are located in said sensor path and separated from adjacent sensors by a distance "L" and further including at least first, second, third and fourth signal transmission means connected to said output signal means of said first, second, third, and fourth sensor means to transmit the signal state of said signal outputs of said first, second, third, and fourth output signal means; signal maintenance means to normally maintain said first, second, third and fourth signal transmission means in said second state; signal flow direction limiting means connecting said output signal means of said sixth sensor means to at least two of said first, second, third and fourth signal transmission means so said at least two of said first, second, third and fourth signal transmission means to which said sixth sensor signal output means are connected by said signal flow direction limiting means are each also operated to said first state by said output signal means of the respective first, second, third and fourth sensors to which the first, second, third or fourth signal transmission means are connected and where the two of said first, second, third and fourth sensors having their output signal means connected to said signal transmission means to which said signal flow direction limiting means from said signal ouput limiting means of said sixth sensor are connected are not located in said sensor path within two sensors of each other and neither of said at least two of said first, second, third, and fourth sensors is adjacent said sixth sensor whereby said at least two of said first, second third and fourth signal transmission means connected to said output signal means of said sixth sensor by said signal flow direction limiting means go to said first state when said output signal means of said sixth sensor is in said first state, and said signal flow direction limiting means prevents the occurrence of a first state signal on one of said at least two of said first, second, third or fourth signal transmission means connected to said sixth sensor means by said signal flow limiting means from being transferred to other of said at least two of said first, second, third, or fourth signal transmission means to which the output signal means of said sixth sensor is also connected by said signal flow direction limiting means.

21. The invention of claim 15 wherein said actuator means includes third actuation means to move parallel to said sensor path with said first and second actuation means in response to movement of said shaft where said third actuation means has third actuation length parallel to said sensor path to allow transmission of said selected energy from said source means to said sensor means when said actuation means is within selected locations relative to said sensor path to actuate said sensors to said first state equal to $[(N_4)L+T]$ where $N_4$ is 0 or a whole integer and "T" is less than "L" but not equal to "D" or "X" and where said third actuation means is located a distance 3D from the next closest side of one of said first and second actuation means and is located on said line parallel to said sensor path where said distance 3D is equal to $(N_7L+K)$ where $N_7$ is "0" or a whole integer and "K" is less than 1 and not equal to "D" and said first, second and third actuation lengths and first and second distances 5D and 3D are selected so that as said first, second and third actuation means are moved in response to movement of said shaft the position of said shaft is indicated by the state of all said sensors and where as said shaft moves from a first segment of the travel path to a second adjacent segment of the travel path at least one first sensor means, engaged by one of said first, second and third actuation means and in said first state, remains engaged by said one of said first, second and third actuation means and in said first state when said element has moved to said second increment, at least one second sensor which was engaged by one of said first, second and third actuation means and was in said first state when said element was in said first segment is disengaged from said one of said first, second and third actuation means and goes to said second state; as said shaft moves to said second adjacent segment of said travel path and where as said shaft moves to a third segment of said travel path adjacent said second segment a third sensor is engaged by one of said first, second and third actuation means and goes to said first state and one said sensor which was engaged by one of said first, second and third actuation means when said shaft was in said second segment remains engaged by said one of said first, second and third actuation means and manitains said third sensor in said first state.

22. The invention of claim 15 including fourth actuation means located in alignment with said first, second, and third actuation means and has an actuation length parallel to said sensor path to allow transmission of said selected energy from said source means to said sensor means to actuate said sensor means to said first state equal to $[(N_5) L+V]$ where $N_5$ is 0 or a whole integer and "V" is less than "L" wherein said first, second, third and fourth actuation means are separated along said actuator means by first distance SD, second distance 3D, and third distance 4D where distance 4D is equal to $(N_6L+M)$ where $N_6$ is "0" or a whole integer and "M" is less than L but not equal to "K" and where said first, second, third and fourth actuation means and the location of said SD, 3D, and 4D distances between said first, second, third, and fourth actuation means are selected so that as said actuator means is moved in response to movement of said shaft the position of said shaft is indicated in segments of the travel path by the state of said sensor means and where as said shaft moves from first segment of the travel path to a second adjacent segment of the travel at least one first sensor means which is engaged by at least one of said first, second, third and fourth actuator means and is in said first state remains engaged by said at least one of said first, second, third, and fourth actuation means and in said first state and at least one second sensor means which was engaged by one of said first, second, third and fourth actuation means and was in said first state when said shaft was in said first segment is disengaged from said one of said first, second, third and fourth actuation means and goes to said second state as said shaft moves to said second adjacent segment of said travel path; and where as said shaft moves to a third segment of said travel path adjacent said second segment a third sensor which was not engaged by one of said first, second, third or fourth actuation means when said shaft was in said next adjacent segment of said travel path is engaged by one of said first, second, third and fourth actuation means and goes to said first state and one sensor which was engaged by one of said first, second, third, and fourth actuation means when said shaft was in said second increment remains engaged by said one of said first, second, third and fourth actuation means and in said first state.

23. The invention of claim 15 wherein said actuation means is a material which is reflective of said electromagnetic radiation which is carried along a second path generally parallel to said sensor path and said source and said sensor means are located so that when said actuation means is in selected locations along said second path electromagnetic radiation from said source means is reflected to said sensor means by said material which has a length equal to $(n+\frac{1}{2})L$.

24. The invention of claims 1 and 2 wherein said device for indicating the position of a shaft adapted to travel bidirectionally in a path of travel between first and second limits including:
 a) a shaft moveable bidirectionally between said first and second limits;
 b) selected energy source means to supply selected energy;
 c) a first set of selected energy responsive sensor means including at least first, second and third sensor means located along a first sensor path generally parallel to said path of travel in generally equally spaced relation where said sensor means of said first set of sensor are operable between first state in response to said selected energy and second state in the absence of said selected energy where each said sensor means includes output signal means to provide first and second signals in response to said first and second states of said sensors; and
 d) a second set of selected radiation energy responsive sensor means including at least first and second sensor means located in equally spaced relation along a second sensor path generally parallel to said path of travel wherein said second sensor path is separate from said first sensor path where said sensor means of said second set of sensors are operable between first state in response to said selected energy and second state in the absence of said selected where each said sensor means of said second sensor set includes output signal means to provide first and second signals in response to said first and second states of said sensor means; and
 e) first and second actuation means to allow transmission of said selected energy from said source to said sensors when said first and second actuation means are in selected locations relative to said sensor paths carried by said shaft means where said first actuator means is disposed to move parallel to said first sensor path in response to movement of said shaft where said first actuation means have first actuation length parallel to said first path sequentially transmit said selected energy to sensor means of said first set of sensor means as said shaft moves, said second actuation means have selected actuation length parallel to said second path to sequentially transmit said energy to sensor means of said second set of sensor means as said shaft moves so that said first actuation means directs energy to of said first sensor of said first set of sensor means and said second actuation means direct no energy to any of the sensor means of said second sensor set means when said shaft means is in a first increment of travel, then as said shaft moves in a first direction to a second increment of travel said second actuation means directs energy to said first sensor means of said second sensor set means while said first actuation means directs said energy to said first sensor means of said first sensor set, and as said shaft moves further in said first direction to a third increment of travel said first actuation means directs energy to no sensor means of said first sensor set and said second actuation means directs energy to said first sensor means of said second sensor set, and as said shaft moves further in said first direction to a fourth increment of travel said first actuation means directs energy to second sensor means of said first sensor set while said second actuation means directs energy to said first sensor means of said second sensor set to indicate the position of said shaft in increments of the travel path in accordance with the state of said sensor means.

25. The invention of claims 1 and 2 wherein said device for indicating the position of a shaft adapted to travel bidirectionally in a path of travel of selected length between first and second limits in generally equal increments of said path of travel includes:
 a) a shaft movable bidirectionally between said first and second limits;
 b) selected energy source means to supply selected energy;
 c) a first set of sensor means responsive to said selected energy including at least first, second and third sensor means located in generally equally spaced relation along a first sensor set path where said sensors of said first set of sensor means and are operable first state in response to receipt of to said energy and operable to second state in the absence of said radiation energy where each said sensor means includes output signal means to provide first and second signals in response to said first and second states of said sensors; and
 (d) a second set of sensor means responsive to said energy including first, and second sensor means located in equally spaced relation along a second sensor path of selected second length where said spacing between said first and second sensors of said second set of sensors is generally equal to the spacing between said first and second sensors of said first set of sensors and wherein said second sensor set path is separate from said first sensor set path and where said sensors of said second set of sensor means and are operable to first state in response to said energy and operable to second state in the absence of said energy where each said sensor means includes output signal means to provide first and second signals in response to said first and second states of said sensors; and e) first and second actuation means carried by said shaft means to allow transmission of radiation energy from said source means to said sensor means when said first and second actuation means are in selected locations relative to said sensor paths where said first actuator means has a first actuation length parallel to said first sensor set path and is disposed to selectively transmit said radiation energy to said sensors of said first set of sensor means as said shaft moves in a first direction, and said second actuation means has a second actuation length parallel to said second sensor set path and is disposed to selectively transmit said energy to said sensors of said first set of sensor means as said shaft moves in said first direction and said first and second actuation means are located in spaced relation and where said first actuation length is greater than the distance between said sensor means of said first set of sensors but less than twice the distance between sensor means of said first set of sensor means and where said second actuation length is less than the distance between sensor means of said second set of sensor means.

* * * * *